(12) United States Patent
Lepage

(10) Patent No.: US 6,219,633 B1
(45) Date of Patent: Apr. 17, 2001

(54) APPARATUS AND METHOD FOR PRODUCING ANALOGICALLY SIMILAR WORD BASED ON PSEUDO-DISTANCES BETWEEN WORDS

(75) Inventor: Yves Lepage, Kyoto (JP)

(73) Assignee: ATR Interpreting Telecommunications Research Laboratories, Kyoto (JP)

( * ) Notice: Subject to any disclaimer, the term of this patent is extended or adjusted under 35 U.S.C. 154(b) by 0 days.

(21) Appl. No.: 09/369,311

(22) Filed: Aug. 6, 1999

(30) Foreign Application Priority Data

Aug. 6, 1998 (JP) .................................................. 10-222724

(51) Int. Cl.$^7$ ............................. G06F 17/27; G06F 17/21
(52) U.S. Cl. .................................. 704/9; 704/1; 707/531
(58) Field of Search ............................ 704/1, 9, 10, 238, 704/251, 252, 255, 256, 257, 270; 707/531, 532, 533, 534, 5, 6, 104

(56) References Cited

U.S. PATENT DOCUMENTS

| 4,348,553 | * | 9/1982 | Baker et al. | 704/241 |
| 5,546,499 | * | 8/1996 | Lynch et al. | 704/240 |
| 5,682,464 | * | 10/1997 | Sejnoha | 704/238 |
| 5,730,468 | * | 3/1998 | Wirtz | 283/70 |
| 6,009,424 | * | 12/1999 | Lepage et al. | 707/6 |

FOREIGN PATENT DOCUMENTS 828 220 A1 * 3/1998 (EP) .

OTHER PUBLICATIONS

Kimmo Koskenniemi, "Two–Level Morphology: A General Computational Model for Word–Form Recognition and Production," Department of General Linguistics, University of Helsinki, Publications, No. 11, pp. 48–57, 1983.
"UNIX User Commands, sed(1), Stream Editor," SUN OS, 5.5.1., Jan. 2, 1996 (last change).
Robert R. Hoffman, "Monster Analogies," AI Magazine, vol. 11, pp. 11–35, Fall 1995.
Esa Itokonen, et al., "A Rehabilitation of Analogy in Syntax (And Elsewhere)," Andras Kertesz (editor), Metalinguistik im Wandel, Peter Lang, pp. 131–177, 1997.
Robert A. Wagner, "The String–To–String Correction Problem," Journal of the Association for Computing Machinery, vol. 21, No. 1, pp. 168–173, Jan. 1974.
Esko Ukkonen, "Algorithms for Approximate String Matching," Information and Control, Academic Press, Inc., vol. 64, pp. 100–118, 1985.

* cited by examiner

*Primary Examiner*—Joseph Thomas

(57) ABSTRACT

In an analogically similar word production apparatus, based on three inputted unit strings, an analogically similar word which is a word analogically similar to inputted unit strings is produced at high speed without using attributes and without any finite state automaton. A pseudo-distance matrix memory stores therein only matrix elements sufficient for computation of limited pseudo distances between two letter strings, out of the elements of two pseudo-distance matrices, and more specifically, matrix elements including diagonal elements are computed by a preprocessing section and then stored in the pseudo-distance matrix memory. An analogically similar word production section, based on the three inputted unit strings, computes a status parameter (com) by looking up to the elements of the two pseudo-distance matrices stored in a pseudo-distance matrix memory, stores the status parameter into an internal parameter memory, computes minimum paths of pseudo distances represented by the two pseudo-distance matrices while updating the status parameter (com), produces an analogically similar word according to the two minimum pseudo-distance paths, and outputs the produced analogically similar word.

6 Claims, 20 Drawing Sheets

Fig.2

EXAMPLE OF EDIT DISTANCES

|   | u | n | l | i | k | e |
|---|---|---|---|---|---|---|
| l | 1 | 2 | 2 | 3 | 4 | 5 |
| i | 2 | 2 | 3 | 2 | 3 | 4 |
| k | 3 | 3 | 3 | 3 | 2 | 3 |
| e | 4 | 4 | 4 | 4 | 3 | 2 |

Fig.3

EXAMPLE OF EDIT DISTANCES

|   | k | n | o | w | n |
|---|---|---|---|---|---|
| l | 1 | 2 | 3 | 4 | 5 |
| i | 2 | 2 | 3 | 4 | 5 |
| k | 2 | 3 | 3 | 4 | 5 |
| e | 3 | 3 | 4 | 4 | 5 |

Fig.4

EXAMPLE OF PSEUDO DISTANCES

|   | l | i | k | e |
|---|---|---|---|---|
| u | 1 | 1 | 1 | 1 |
| n | 2 | 2 | 2 | 2 |
| l | 2 | 2 | 2 | 2 |
| i | 3 | 2 | 2 | 2 |
| k | 4 | 3 | 2 | 2 |
| e | 5 | 4 | 3 | 2 |

Fig.5

EXAMPLE OF PSEUDO DISTANCES

|   | u | n | l | i | k | e |
|---|---|---|---|---|---|---|
| l | 1 | 1 | 0 | 0 | 0 | 0 |
| i | 2 | 2 | 1 | 0 | 0 | 0 |
| k | 3 | 3 | 2 | 1 | 0 | 0 |
| e | 4 | 4 | 3 | 2 | 1 | 0 |

Fig.6

EXAMPLE OF PSEUDO EDIT DISTANCES

| e | k | i | l | n | u |   | k | n | o | w | n |
|---|---|---|---|---|---|---|---|---|---|---|---|
| 0 | 0 | 0 | 0 | 1 | 1 | l | 1 | 1 | 1 | 1 | 1 |
| 0 | 0 | 0 | 1 | 2 | 2 | i | 2 | 2 | 2 | 2 | 2 |
| 0 | 0 | 1 | 2 | 3 | 3 | k | 2 | 2 | 2 | 2 | 2 |
| 0 | 1 | 2 | 3 | 4 | 4 | e | 3 | 3 | 3 | 3 | 3 |

Fig.7

EXAMPLE OF LIMITED PSEUDO EDIT DISTANCES

| e | k | i | l | n | u |   | k | n | o | w | n |
|---|---|---|---|---|---|---|---|---|---|---|---|
| . | . | . | 0 | 1 | 1 | l | 1 | 1 | . | . | . |
| . | . | 0 | 1 | 2 | . | i | . | 2 | 2 | . | . |
| . | 0 | 1 | 2 | . | . | k | . | . | 3 | 3 | . |
| 0 | 1 | 2 | . | . | . | e | . | . | . | 4 | 4 |

Fig.8

| e | k | i | l | n | u |  | k | n | o | w | n |
|---|---|---|---|---|---|---|---|---|---|---|---|
| . | . | . | ⓪ | ① | ① | l | ① | ① | . | . | . |
| . | . | ⓪ | 1 | 2 | . | i | . | 2 | ② | . | . |
| . | ⓪ | 1 | 2 | . | . | k | . | . | 3 | ③ | . |
| ⓪ | 1 | 2 | . | . | . | e | . | . | . | 4 | ④ |

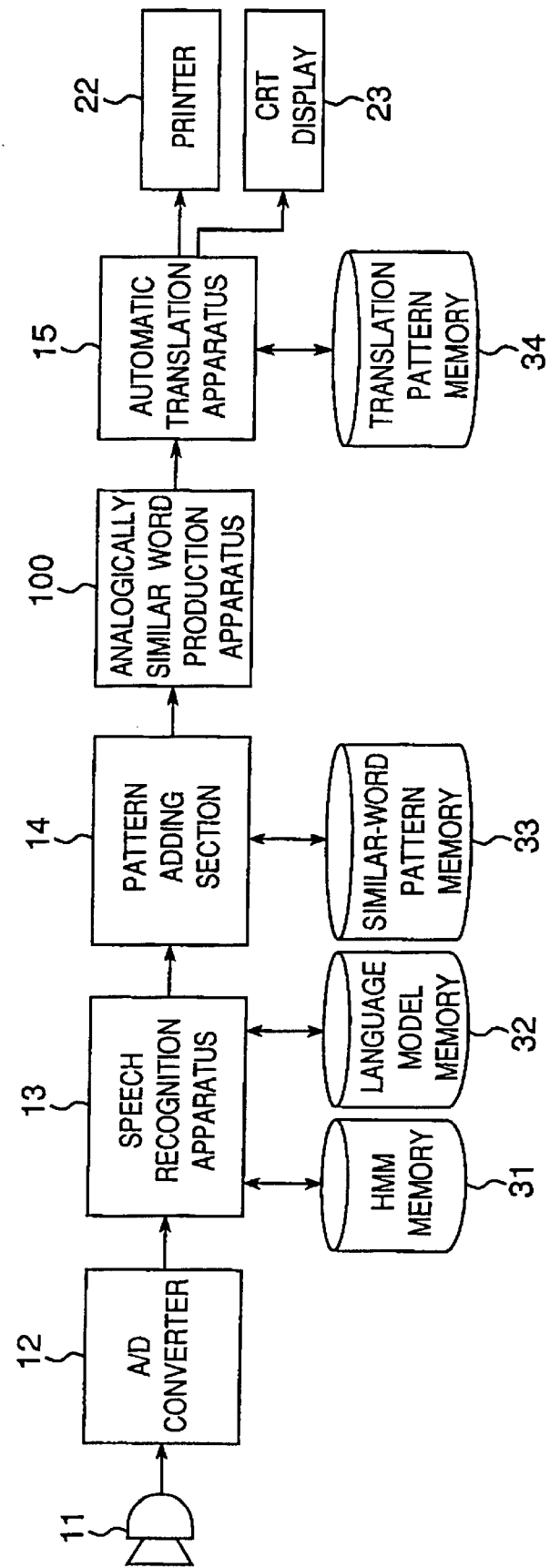

$l1 = l2$ $l1 = l2$

DIAGONAL BAND

DIAGONAL BAND
EXTRA BAND
EXTRA BAND ptinstance
APPARATUS AND METHOD FOR PRODUCING ANALOGICALLY SIMILAR WORD BASED ON PSEUDO-DISTANCES BETWEEN WORDS

BACKGROUND OF THE INVENTION

1. Field of the Invention

The present invention relates to analogically similar word production apparatus and method for producing or generating an analogically similar word analogized from three inputted unit strings. More particularly, the invention relates to analogically similar word production apparatus and method for producing or generating a unit string composed of a plurality of units whose property or attribute is analogically similar in a predetermined analogically similar relation to three inputted unit strings given in a predetermined order. In this case, the unit is a character, an alphabetical letter, a word or the like.

2. Description of the Prior Art

Conventionally, as a procedure to produce a new word which is morphologically related to another word, techniques such as finite state automata are used. For example, Prior Art Document 1, Kimmo Koskenniemi, "Two Level-Morphology: A General Computational Model for Word Form Recognition and Production", Department of General Linguistics, University of Helsinki, 1983, has proposed a method for producing a word with respect to some attributes which specify a certain form and which are given this certain form (hereinafter, referred to as a first prior art).

For example, production of a letter string "unlike" from a letter string "like" and an attribute or property "antonym" is considered. According to the first prior art, if the attribute "antonym" is given to a finite state automaton, and if this finite state automaton converts the attribute into the task of inserting a prefix, namely "un", before the word to which the attribute has been given, then the letter string "like" can be transformed into the letter string "unlike" with a prefix "un" inserted, and therefore the antonym of the letter string "like" can be computed as "unlike". Similarly, the antonym of a letter string "known" can also be computed using the same method, and therefore the antonym of the letter string "known" can be computed as "unknown".

In the first prior art, in order that a new letter string be produced, it is therefore necessary to input attributes at the same time the letter string is given to the finite state automaton. Therefore, by executing the finite state automaton, a word similar to an inputted word but different therefrom with some attributes inputted can be obtained. In particular, because the whole process is implemented by the finite state automaton, the first prior art method has an advantage of operating at relatively high speed.

Likewise, Prior Art Document 2, "Unix user commands, sed—stream editor", has proposed a method for replacing a letter string by another letter string by means of description of regular expressions (hereinafter, referred to as a second prior art).

For example, replacement of a letter string "miracle" by a letter string "miraculous" is considered. According to the second prior art, if the letter string "miracle" and the letter string "miraculous" are given to a finite state automaton, and if this finite state automaton first recognizes the letter string "miracle", delimits its boundaries in a letter stream, and replaces the letter string "miracle" by the letter string "miraculous" within the boundaries, then the letter string "miracle", when recognized in the letter stream, can be replaced into the letter string "miraculous". For instance, in a letter stream "it was a miracle and fable healing", the letter string "miracle" can be replaced by the letter string "miraculous". Therefore, by executing the method of the second prior art, the replacement of a letter string by another letter string can be achieved.

However, since the first prior art method produces a word form by using a finite state automaton, the method involves preparatory registration of all the possible letter strings that can be added as prefixes, suffixes or infixes with respect to an object language. Hence, the first prior art requires a linguistic description of the object language which is not immediate. Therefore, the first prior art requires the involvement of specialized workers to establish the non-immediate linguistic description of an object language.

Also, since the second prior art method is based on a finite state automaton method, the replacement of, for example, a letter string "fable" by a letter string "fabulous" is impossible even if the letter strings "miracle" and "miraculous" are given to the finite state automaton. However, the letter string "fabulous" is in the same relation to the letter string "fable" as the letter string "miraculous" is to the letter string "miracle". Therefore, the second prior art can not perform the replacement of analogically similar words.

SUMMARY OF THE INVENTION

An essential object of the present invention is therefore to provide analogically similar word production apparatus and method capable of solving the aforementioned problems and of producing, based on three inputted unit strings, an analogically similar word which is a unit string analogically similar to and other than the three inputted unit strings, without using attributes and without using any finite state automaton, at higher speed than the prior art.

In order to achieve the aforementioned objective, according to one aspect of the present invention, there is provided an analogically similar word production apparatus (100) for, based on first, second and third three inputted unit strings which are inputted in a predetermined order, producing an analogically similar word having properties analogically similar in a predetermined analogically similar relation to the first to third unit strings, comprising:

matrix storage means (10) for storing a plurality of elements of a first limited pseudo-distance matrix, and a plurality of elements of a second limited pseudo-distance matrix, a number of units to be deleted or replaced toward another unit string from one unit string being expressed by a pseudo-distance, said plurality of elements of said first limited pseudo-distance matrix being computed at locations of a part of elements of a first pseudo-distance matrix presenting pseudo-distances between partial strings of the first inputted unit string from its beginning to its end and partial strings of the second inputted unit string from its beginning to its end, said plurality of elements of said first limited pseudo-distance matrix including a diagonal band composed of diagonal elements having a predetermined width in said first pseudo-distance matrix, and including an extra band composed of elements having a predetermined further width in said first pseudo-distance matrix which are positioned outside of said diagonal band, so as to include information sufficient for computation of limited pseudo distances between the first inputted unit string and the second inputted unit string, said plurality of elements of said second limited pseudo-distance matrix being computed at locations of a part of elements of a second pseudo-distance matrix presenting pseudo-distances between partial strings of the first inputted unit string from its beginning to its end and partial strings of the third inputted unit string from its beginning to its end, said plurality of elements of said second limited pseudo-distance matrix including a diagonal band composed of diagonal elements having a predetermined width in said second pseudo-distance matrix, and including an extra band composed of elements having a predetermined further width in said second pseudo-distance matrix which are positioned outside of said diagonal band, so as to include information sufficient for computation of limited pseudo distances between the first inputted unit string and the third inputted unit string;

preprocessing means (2, S2) for analyzing the three inputted unit strings, computing the elements of the limited first and second pseudo-distance matrices, and storing computed elements into said matrix storage means (10);

parameter storage means (51) for storing therein a status parameter (com) which is a parameter for judging whether or not four unit strings including the first, second and third inputted unit strings, and produced fourth inputted unit string are in said analogically similar relation, and which represents a number of units common to the four unit strings upon producing the fourth unit string; and analogically similar word production means (5, S3) for, based on respective lengths of said inputted three unit strings and respective elements of said limited first and second pseudo-distance matrices which are stored in said matrix storage means (10), computing an initial value of said status parameter (com) and storing the initial value in said parameter storage means (51), thereafter, based on the status parameter (com) stored in said parameter storage means (51) and respective elements of said limited first and second pseudo-distance matrices stored in said matrix storage means (10), deciding (S63–S68) a shortest path from a last element to a first element in said first limited pseudo-distance and a shortest path from a last element to a first element in said second limited pseudo-distance while updating (S74) the status parameter (com) stored in said parameter storage means (51), by moving said paths from an element to another element in a moving direction which is either one of a diagonal direction, a horizontal direction and a vertical direction in said limited first and second pseudo-distance matrices, and then, producing and outputting the analogically similar word according to decided shortest baths of said limited first and second pseudo-distance matrices.

In the above-mentioned apparatus, the unit string is a letter string, and the unit which constitutes the unit string is a letter. Alternatively, in the above-mentioned apparatus, the unit string is a word string, and the unit which constitutes the unit string is a word.

According to another aspect of the present invention, there is provided an analogically similar word production method (100) for, based on first, second and third three inputted unit strings which are inputted in a predetermined order, producing an analogically similar word having properties analogically similar in a predetermined analogically similar relation to the first to third unit strings, including steps of:

analyzing (2, S2) the inputted three unit strings, computing a plurality of elements of a first limited pseudo-distance matrix, and a plurality of elements of a second limited pseudo-distance matrix, and storing computed elements into in matrix storage means (10), a number of units to be deleted or replaced toward another unit string from one unit string being expressed by a pseudo-distance, said plurality of elements of said f irst limited pseudo-distance matrix being computed at locations of a part of elements of a first pseudo-distance matrix presenting pseudo-distances between partial strings of the first inputted unit string from its beginning to its end and partial strings of the second inputted unit string from its beginning to its end, said plurality of elements of said first limited pseudo-distance matrix including a diagonal band composed of diagonal elements having a predetermined width in said first pseudo-distance matrix, and including an extra band composed of elements having a predetermined further width in said first pseudo-distance matrix which are positioned outside of said diagonal band, so as to include information sufficient for computation of limited pseudo distances between the first inputted unit string and the second inputted unit string, said plurality of elements of said second limited pseudo-distance matrix being computed at locations of a part of elements of a second pseudo-distance matrix presenting pseudo-distances between partial strings of the first inputted unit string from its beginning to its end and partial strings of the third inputted unit string from its beginning to its end, said plurality of elements of said second limited pseudo-distance matrix including a diagonal band composed of diagonal elements having a predetermined width in said second pseudo-distance matrix, and including an extra band composed of elements having a predetermined further width in said second pseudo-distance matrix which are positioned outside of said diagonal band, so as to include information sufficient for computation of limited pseudo distances between the first inputted unit string and the third inputted unit string;

based on respective lengths of said inputted three unit strings and respective elements of said limited first and second pseudo-distance matrices which are stored in said matrix storage means (10), computing an initial value of a status parameter (com) which is a parameter for judging whether or not four unit strings including the first, second and third inputted unit strings, and produced fourth inputted unit string are in said analogically similar relation, and which represents a number of units common to the four unit strings upon producing the fourth unit string, and then, storing the initial value in a parameter storage means (51);

based on the status parameter (com) stored in said parameter storage means (51) and respective elements of said limited first and second pseudo-distance matrices stored in said matrix storage means (10), deciding (S63–S68) a shortest path from a last element to a first element in said first limited pseudo-distance and a shortest path from a last element to a first element in said second limited pseudo-distance while updating (S74) the status parameter (com) stored in said parameter storage means (51), by moving said paths from an element to another element in a moving direction which is either one of a diagonal direction, a horizontal direction and a vertical direction in said limited first and second pseudo-distance matrix; and producing and outputting (5, S3) the analogically similar word according to decided shortest paths of said limited first and second pseudo-distance matrices.

In the above-mentioned method, the unit string is a letter string, and the unit which constitutes the unit string is a letter. Alternatively, in the above-mentioned method, the unit string is a word string, and the unit which constitutes the unit string is a word.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2 is a table showing an edit distance matrix representing edit distances between an inputted first letter string "like" and an inputted second letter string "unlike" in a prior art;

FIG. 3 is a table showing an edit distance matrix representing edit distances between the inputted first letter string "like" and an inputted third letter string "known" in the prior art;

FIG. 4 is a table showing a pseudo-distance matrix representing pseudo distances between two letter strings, where the inputted first letter string A is "unlike" and the inputted second letter string B is "like" in a preferred embodiment according to the present invention;

FIG. 5 is a table showing a pseudo-distance matrix representing pseudo distances between two letter strings, where the inputted first letter string A is "like" and the inputted second letter string B is "unlike" in a preferred embodiment according to the present invention;

FIG. 6 is a table showing a pseudo-distance matrix representing pseudo distances of an inputted first letter string "like", which is represented along the longitudinal axis, to an inputted second letter string "unlike" and an inputted third letter string "known" in a preferred embodiment according to the present invention;

FIG. 7 is a table showing a limited pseudo-distance matrix resulting from calculating matrix elements only within diagonal bands in the pseudo-distance matrix of FIG. 6;

FIG. 8 is a table showing a pseudo-distance matrix in which elements along the shortest paths are circled in the pseudo-distance matrix of FIG. 7;

FIG. 20 is a block diagram showing a speech automatic translation system equipped with the analogically similar word production apparatus 100 of FIG. 1;

FIG. 21 is a schematic diagram showing a first example of the diagonal band in a pseudo-distance matrix of the preferred embodiment;

FIG. 22 is a schematic diagram showing a second example of the diagonal band in a pseudo-distance matrix of the preferred embodiment;

DETAILED DESCRIPTION OF THE PREFERRED EMBODIMENTS

Figure 1:
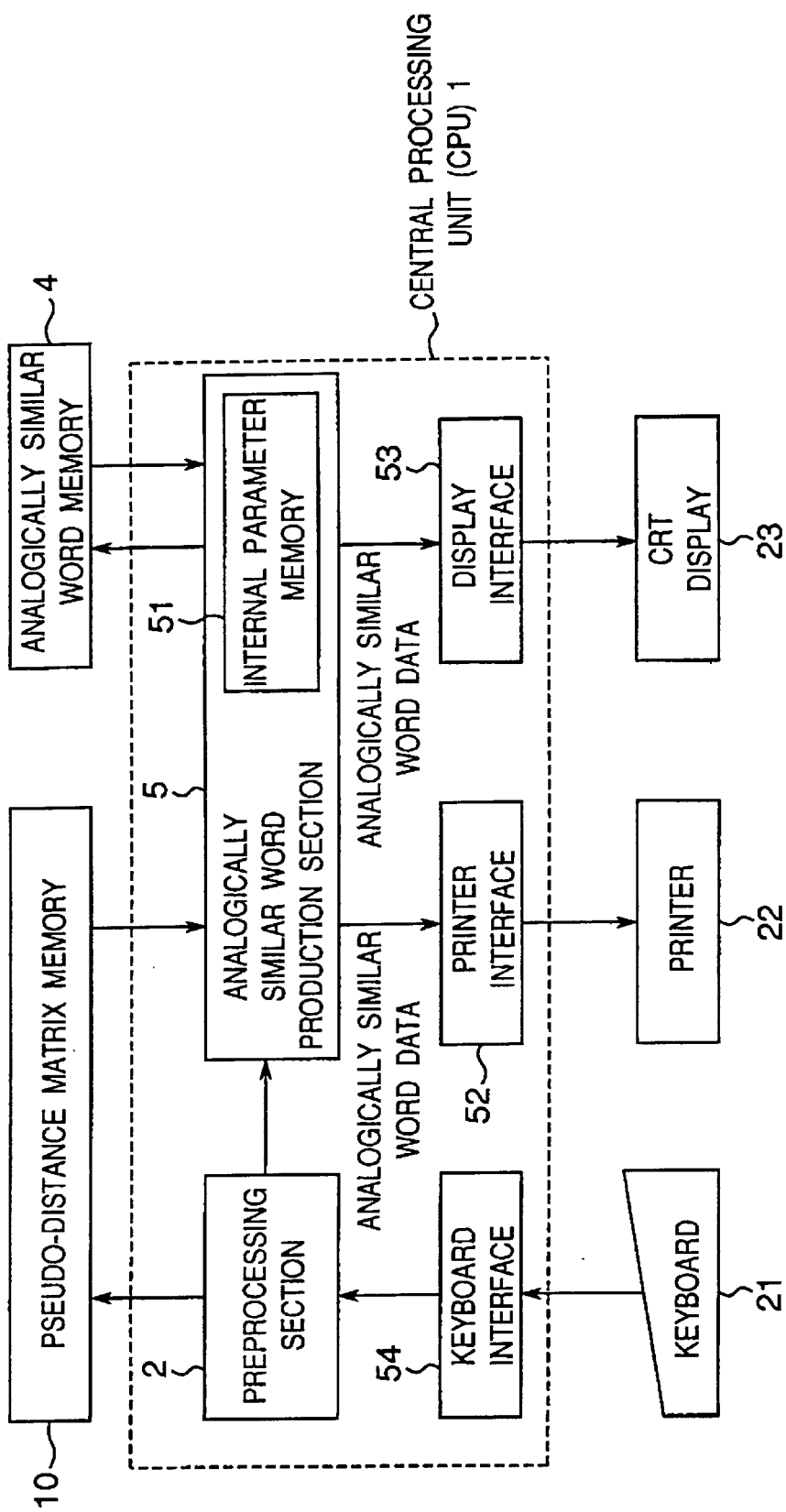
FIG. 1 is a block diagram of an analogically similar word production apparatus 100 according to a preferred embodiment of the present invention.

Preferred embodiments of the present invention are described below with reference to the accompanying drawings. Throughout the drawings, like components are designated by like reference numerals. The term "element" herein refers to an element of a matrix, hereinafter.

FIG. 1 is a block diagram of an analogically similar word production apparatus 100 according to a preferred embodiment of the present invention. The analogically similar word production apparatus 100 of present preferred embodiment is an analogically similar word production apparatus for producing a unit string of a letter string which is analogically similar to three letter strings inputted in a predetermined order (hereinafter, the unit string will be referred to as an analogically similar word), comprising the followings:

(a) a pseudo-distance matrix memory 10 for storing therein only intermediate-information elements which are necessary and sufficient for computation of limited pseudo-distance values and which express the pseudo-distance values between (a1) each partial string of the first letter string, starting from its beginning up to its end, and each partial string of the second letter string, starting from its beginning up to its end, and between (a2) each partial string of the first letter string, starting from its beginning up to its end, and each partial string of the third letter string, starting from its beginning up to its end, of the first, second and third three letter strings inputted in a predetermined order by means of a keyboard 21 via a keyboard interface 54;

(b) a preprocessing section 2 for analyzing the inputted three letter strings to compute the elements of the pseudo-distance matrices, and making the pseudo-distance values stored into the pseudo-distance matrix memory 10;

(c) an analogically similar word memory 4 for storing therein produced analogically similar words; and (d) an analogically similar word production section 5 which is internally provided with an internal parameter memory 51 for temporarily storing therein a produced analogically similar word, and which operates to produce an analogically similar word with reference to the pseudo-distance matrices stored in the pseudo-distance matrix memory 10 in conformity with the analogically similar word production process every time letter strings are inputted from the preprocessing section 2, to store the produced analogically similar word into the analogically similar word memory 4, and to output the analogically similar word to a printer 22 via a printer interface 52 or to a CRT display 23 via a display interface 53. In this case, the pseudo distance between two letter strings (words) refers to a number of letters that have been deleted or replaced to produce, from a first letter string, another second letter string.

In this case, in the pseudo-distance matrix memory 10 are stored only matrix elements which are necessary and sufficient to compute pseudo distances between individual two letter strings, out of the elements of two pseudo-distance matrices, and in more detail, matrix elements including diagonal array elements are computed and stored as will be detailed with reference to FIG. 7. The analogically similar word production section 5 computes a status parameter "com" based on the three inputted letter strings and with reference to the individual elements of the first and second pseudo-distance matrices stored in the pseudo-distance matrix memory 10, stores the computed status parameter "com" into the internal parameter memory 51, computes minimum paths of pseudo distances represented by the first and second pseudo-distance matrices while updating the status parameter "com", produces an analogically similar word in conformity with the two minimum pseudo-distance paths, and outputs the produced analogically similar word.

In this connection, the analogically similar word production section 5 produces an analogically similar word with respect to three letter strings inputted in a predetermined order, only when values read from the pseudo-distance matrix memory 10 reflect the validity of analogical constraint conditions. In the present preferred embodiment, the letter targeted for the analogically similar word production is a Latin letter, and the letter string is a Latin letter string or Latin alphabet. In addition, this letter may be a letter or word of other languages.

Referring to FIG. 1, a central processing unit 1 is provided by, for example, a digital computer comprising a CPU for executing an analogically similar word production process by the analogically similar word production apparatus 100, a ROM (Read Only Memory) for storing therein a program to be executed and data required in executing the program, and a RAM (Random Access Memory) which is used as a work area of the CPU, and the central processing unit comprises a preprocessing section 2 and an analogically similar word production section 5 which are connected to each other. It is noted that the preprocessing section 2 and the analogically similar word production section 5 may be implemented by other digital computers, respectively.

The preprocessing section 2 is connected to a keyboard 21 for inputting input data of three letter strings via a keyboard interface 54 that performs the processing of signal conversion or the like. The preprocessing section 2 and the analogically similar word production section 5 are connected to the pseudo-distance matrix memory 10 provided by, for example, a hard disk memory.

The analogically similar word production section 5 is provided by, for example, a RAM, and internally provided with the internal parameter memory 51 for temporarily storing therein a specified parameter. Also, the analogically similar word production section 5 is connected to the analogically similar word memory 4 which is provided by, for example, a hard disk memory and which stores therein a produced analogically similar word. The analogically similar word production section 5 is connected also to the printer 22 for printing data of an analogically similar word production result via the printer interface 52 for executing processing such as signal conversion and connected to the CRT display 23 for displaying the data of the analogically similar word production result via the display interface 53 for executing processing such as signal conversion.

For the analogically similar word production section 5, when several letters of the inputted first letter string do not appear in any of the inputted second and third letter strings, it is impossible to produce an analogically similar word. Contra-positively, in order to produce an analogically similar word analogized from the inputted three letter strings, any arbitrary letter in the inputted first letter string must appear in either the inputted second letter string or the inputted third letter string. Therefore, in order to produce an analogically similar word from the inputted three unit strings, common partial strings between the inputted first letter string and the inputted second letter string and common partial strings between the inputted first letter string and the inputted third letter string must be nonempty. Accordingly, the production of an analogically similar word depends on the detection of common partial strings between the inputted first letter string and the inputted second letter string and common partial strings between the inputted first letter string and the inputted third letter string.

Thus, in the method for computing a common partial string between inputted letter strings, first of all, a pseudo-distance matrix between the inputted first letter string and the inputted second letter string, and a pseudo-distance matrix between the inputted first letter string and the inputted third letter string are computed in the preprocessing section 2, and then minimum paths of pseudo distances in the two pseudo-distance matrices are computed in the analogically similar word production section 5. An analogically similar word can be computed by computing the minimum paths of pseudo distances in the two pseudo-distance matrices. Also, the analogically similar word comprises partial strings of the inputted third letter string corresponding to partial strings common between the inputted first letter string and the inputted second letter string, partial strings of the inputted second letter string corresponding to partial strings common between the inputted first letter string and the inputted third letter string, and partial strings common between the inputted first letter string, the inputted second letter string and the inputted third letter string. In this case, the paths in the pseudo-distance matrices are computed in concatenation from one element to the succeeding element in the pseudo-distance matrices so as to be directed from the end letter to the first letter of an inputted letter string. It is noted that movement along the paths is performed necessarily in only one direction among the diagonal, vertical and horizontal directions.

In the analogically similar word production apparatus 100, based on first, second and third three inputted unit strings which are inputted in a predetermined order, producing an analogically similar word having properties analogically similar in a predetermined analogically similar relation to the first to third unit strings. The pseudo-distance matrix memory 10 is provided for storing a plurality of elements of a first limited pseudo-distance matrix, and a plurality of elements of a second limited pseudo-distance matrix. A number of units to be deleted or replaced toward another unit string from one unit string is expressed by a pseudo-distance. A plurality of elements of the first limited pseudo-distance matrix is computed at locations of a part of elements of a first pseudo-distance matrix presenting pseudo-distances between partial strings of the first inputted unit string from its beginning to its end and partial strings of the second inputted unit string from its beginning to its end, and the plurality of elements of the first limited pseudo-distance matrix include a diagonal band composed of diagonal elements having a predetermined width in the first pseudo-distance matrix, and includes an extra band composed of elements having a predetermined further width in the first pseudo-distance matrix which are positioned outside of the diagonal band, so as to include information sufficient for computation of limited pseudo distances between the first inputted unit string and the second inputted unit string. Further, a plurality of elements of the second limited pseudo-distance matrix is computed at locations of a part of elements of a second pseudo-distance matrix presenting pseudo-distances between partial strings of the first inputted unit string from its beginning to its end and partial strings of the third inputted unit string from its beginning to its end, and the plurality of elements of the second limited pseudo-distance matrix including a diagonal band composed of diagonal elements having a predetermined width in the second pseudo-distance matrix, and includes an extra band composed of elements having a predetermined further width in the second pseudo-distance matrix which are positioned outside of the diagonal band, so as to include information sufficient for computation of limited pseudo distances between the first inputted unit string and the third inputted unit string. The preprocessing section 2 is provided for analyzing the three inputted unit strings, computing the elements of the limited first and second pseudo-distance matrices, and storing computed elements into the pseudo-distance matrix memory 10. The internal parameter memory 51 is provided for storing therein a status parameter com which is a parameter for judging whether or not four unit strings including the first, second and third inputted unit strings, and produced fourth unit string are in the analogically similar relation, and which represents a number of units common to the four unit strings upon producing the fourth unit string. Further, the analogically similar word production section 5 is provided for, based on respective lengths of the inputted three unit strings and respective elements of the limited first and second pseudo-distance matrices which are stored in the pseudo-distance matrix memory 10, computing an initial value of the status parameter com and storing (step S61 of FIG. 61) the initial value in the internal parameter memory 51, thereafter, based on the status parameter com stored in the internal parameter memory 51 and respective elements of the limited first and second pseudo-distance matrices stored in the pseudo-distance matrix memory 10, deciding (steps S63–S68 of FIG. 16) a shortest path from a last element to a first element in the first limited pseudo-distance and a shortest path from a last element to a first element in the second limited pseudo-distance while updating (step S74 of FIG. 18) the status parameter com stored in the internal parameter memory 51, by moving the paths from an element to another element in a moving direction which is either one of a diagonal direction, a horizontal direction and a vertical direction in the limited first and second pseudo-distance matrices, and then, producing and outputting the analogically similar word according to decided shortest paths of the limited first and second pseudo-distance matrices.

First of all, an analogically similar word production process to be executed in the analogically similar word production apparatus 100 of FIG. 1 is described. For the introduction of the analogically similar word production process in the present preferred embodiment, we take a path that is inverse to the historical development of the idea of analogy (See, for example, Prior Art Document 3, Robert R. Hoffman, "Monster Analogy", AI Magazine, vol. 11, pp. 11–35, Fall, 1995). This is necessary because a certain incomprehension is faced when speaking about linguistic analogy, i.e., it is generally given a broader and more psychological definition. Also, with our proposal being computational, it is impossible to ignore work related to analogy in computer science, which has come to mean artificial intelligence.

Next, the algorithm for the analogically similar word production process is described. Prior Art Document 4, Esa Itkonen et al., "A Rehabilitation of analogy in syntax (and elsewhere)", Andras Kertesz (ed.), Metalinguistikim Wandel: die kognitive Wende in Wissenschaftstheorie und Linguistik Frankfurt a/M, Peter Lang, pp. 131–171, 1997, gives a program in Prolog to solve analogies in sentences, as a refutation of Chomsky, according to whom analogy would not be operational in syntax, because analogy delivers non-grammatical sentences. That analogy would apply also to syntax, was advocated decades ago by Hermann Paul and Bloomfield. Chomsky's claim is unfair, because it supposes that analogy applies only on the symbol level. Itkonen et al. show that analogy, when controlled by some structural level, does deliver perfectly grammatical sentences. What is of interest to us, is the essential technique of their method, which is the seed for the analogically similar word production process of present preferred embodiment. That is, an outputted analogically similar word D is formed by looking into an inputted second letter string B and an inputted third letter string C one letter at a time, and by looking into the relations of each element to the structure of an inputted first letter string A (plus the coupling with part of the outputted analogically similar word D that is ready). Hence, the inputted first letter string A is the axis against which the inputted second letter string B and the inputted third letter string C are compared, and by opposition to which the outputted analogically similar word D is built.

Therefore, the analogically similar word production process is as follows:

(a) First of all, with the inputted first letter string A taken as the axis, apartial letter string of the inputted second letter string B that is not common to the inputted first letter string A is searched for on one hand, and a partial letter string of the inputted third letter string C that is not common to the inputted first letter string A is searched for on the other hand; and (b) Then, those partial letter strings are arranged into a correct order.

The following equation shows, as an example of the procedure for the analogically similar word production process, a relational equation for producing an analogically similar word x, assuming that the inputted first letter string A is "reader", the inputted second letter string B is "unreadable" and the inputted third letter string C is "doer":

$$\text{reader: unreadable} = \overline{\text{doer}}:x \Rightarrow x = \text{und}\overline{\text{oable}} \tag{1}$$

The analogically similar word production process is explained along the above steps:

(a) First of all, looking for partial letter strings which are not common to the inputted first letter string A in the inputted second letter string B "unreadable" makes it found that partial letter strings "un" and "able" are not common. Also, looking for partial letter strings which are not common to the inputted first letter string A "reader" in the inputted third letter string C "doer" makes a partial letter string "do" searched out.

(b) Then, putting them together in the right order results in "un" "do" "able" so that an analogically similar word "undoable" is produced as a final result.

The above step (a) is executed by looking for partial letter strings common between the first letter string A "reader" and the second letter string B "unreadable" (or between the first letter string A "reader" and the third letter string C "doer") by complementation.

For example, Prior Art Document 5, Robert A. Wagner et al., "The String-to-String Correction Problem", Journal for the Association of Computing Machinery, vol. 21, No1, pp. 168–173, January, 1974, proposes a method to find the longest common partial letter string between two letter strings by computing edit distance matrices (hereinafter, referred to as fifth prior art), the method yielding the minimal number of edit operations (replacement, deletion and insertion of letters) necessary to transform one letter string X into another letter string Y. The number of edit operations is referred to as an edit distance dist (X, Y) between the one letter string X and another letter string Y.

Here is considered a case where the first letter string "like", the second letter string "unlike" and the third letter string "known" are inputted in the fifth prior art. FIG. 2 is a table showing an edit distance matrix representing edit distances between the inputted first letter string "like" and the inputted second letter string "unlike" in the fifth prior art, and FIG. 3 is a table showing an edit distance matrix representing edit distances between the inputted first letter string "like" and the inputted third letter string "known" in the fifth prior art. In FIGS. 2 and 3, similarly, the rightmost-column, lowest-row numerical value represents the edit distance between the two letter strings. Therefore, referring to FIGS. 2 and 3, edit distance dist (like, unlike)=2, edit distance dist (like, known)=5.

Next, the pseudo distance between words to be used in the present preferred embodiment of the invention is described. The number of letters of the longest common subsequence between the inputted first letter string A and the inputted second letter string B is herein referred to as similitude sim (A, B) between two letter strings. Also, the number of letters of the inputted first letter string A, minus the number of letters deleted or replaced for the production of the inputted second letter string B is herein referred to as pseudo distance, which is defined as pdist (A, B) and which can be computed exactly as the edit distances, except that insertion cost is 0:

$$\text{sim}(A, B) = |A| - \text{pdist}(A, B) \tag{2}$$

FIG. 4 is a table showing a pseudo-distance matrix representing pseudo distances between inputted letter strings, where the inputted first letter string A is "unlike" and the inputted second letter string B is "like" in a preferred embodiment according to the present invention. FIG. 5 is a table showing a pseudo-distance matrix representing pseudo distances between inputted letter strings, where the inputted first letter string A is "like" and the second letter string B is "unlike" in a preferred embodiment according to the present invention. The values of pseudo distances between the first letter string A and the second letter string B are the values of the last-row, last-column elements in the pseudo-distance matrices. Similarly, referring to FIG. 4 one finds that the pseudo distance pdist (unlike, like)=2, and referring to FIG. 5 one finds that the pseudo distance pdist (like, unlike)=0.

Letters inserted into the second letter string B or the third letter string C may be stored aside as letters that are desired to be incorporated in the analogically similar word D because those letters are apparently part of the second letter string B and the third letter string C and absent in the first letter string A.

FIG. 6 is a table showing a pseudo-distance matrix representing pseudo distances between the inputted first letter string "like", which is taken as the longitudinal axis, and each of the inputted second letter string "unlike" and the inputted third letter string "known" in a preferred embodiment according to the present invention. The inputted first letter string A, because of being the axis for analogy, is taken as the longitudinal axis in executing pseudo-distance computations around this axis in pseudo-distance matrices. For instance, in the case of like:unlike=known:x, the pseudo-distance matrix results in a matrix as shown in FIG. 6.

Next, constraint conditions to be applied are described. It is easy to verify that there is no solution to an analogy if some letters of the first letter string A appear neither in the second letter string B nor in the third letter string C. Contra-positively, for an analogy to hold, any letter of the first letter string A has to appear in either the second letter string B or the third letter string C. Hence, the sum of a similitude sim (A, B) between the first letter string A and the second letter string B and a similitude sim (A, C) between the first letter string A and the third letter string C must be greater than or equal to the number of letters |A| of the first letter string A:

$$\text{sim}(A, B) + \text{sim}(A, C) \geq |A| \tag{3}$$

This equation can be rewritten into the following equation:

$$|A| \geq \text{pdist}(A, B) + \text{pdist}(A, C) \tag{4}$$

In the above equations, when the number of letters |A| of the first letter string A is greater than the sum of the two pseudo distances, a partial letter string (or subsequence) present in the first letter string A is common among all the letter strings in the same order. Such a common partial letter string has to be present also in the analogically similar word D. The sum of the lengths (numbers of letters) of such subsequences is defined as com (A, B, C, D). The delicate point is that this sum depends precisely on the analogically similar word D being currently built by the analogically similar word production process of present preferred embodiment of the present invention. To summarize, for an analogy A:B=C:D to hold, the following equation must be verified:

$$|A|=\text{pdist}(A, B)+\text{pdist}(A, C)+\text{com}(A, B, C, D) \quad (5)$$

Next, details of the analogically similar word production process according to present preferred embodiment are explained. The analogically similar word production process of present preferred embodiment is founded on the computation of two pseudo-distance matrices performed between the first three inputted letter strings in the analogically similar word production process. A result of Prior Art Document 6, Esko Ukkonen, "Algorithms for Approximate String Matching", Information and Control, 64, pp. 100–118, 1985, says that it is sufficient to compute a diagonal band plus two extra bands on each of the two sides of the edit distance matrix, in order to get an exact distance, if the value of the overall distance is known to be less than a specified threshold value.

Figure 23:
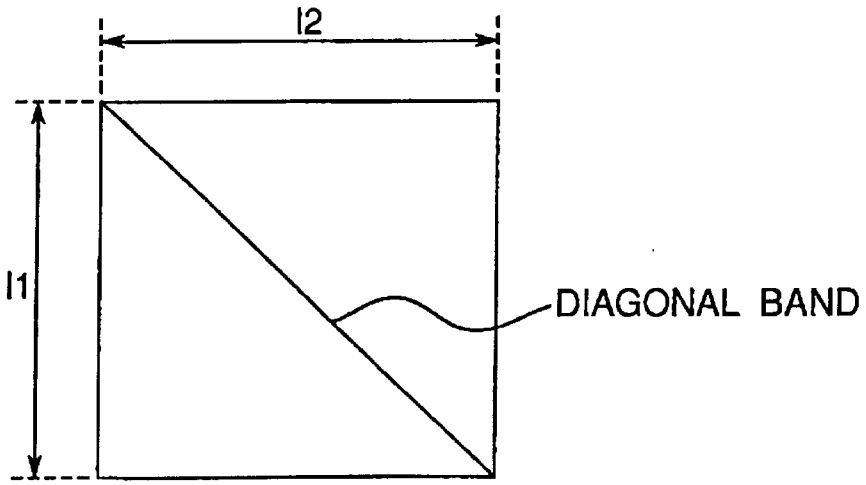
FIG. 23 is a schematic diagram showing a third example of the diagonal band in a pseudo-distance matrix of the preferred embodiment.
Figure 24:
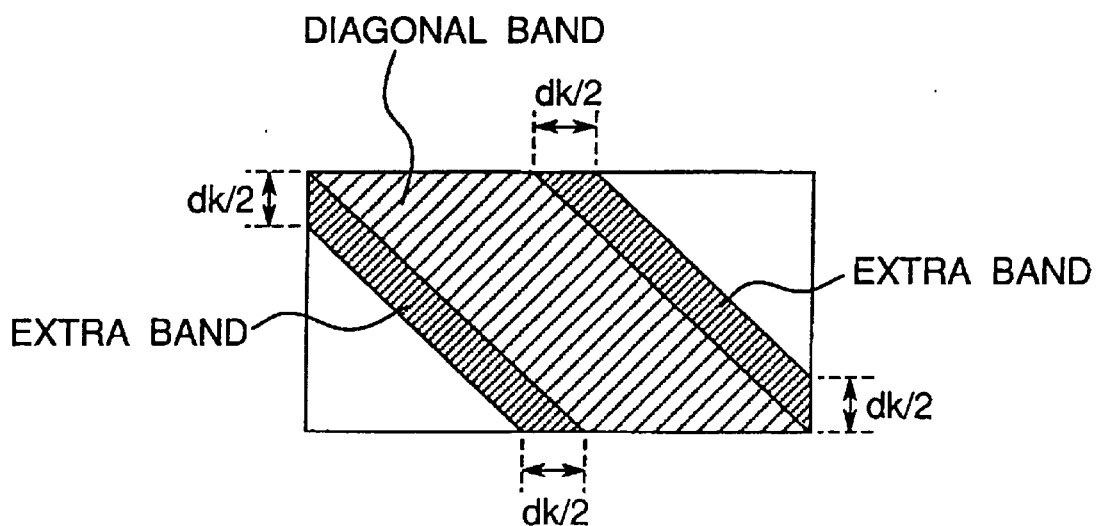
FIG. 24 is a schematic diagram showing a first example of the extra bands in a pseudo-distance matrix of the preferred embodiment.
Figure 23:
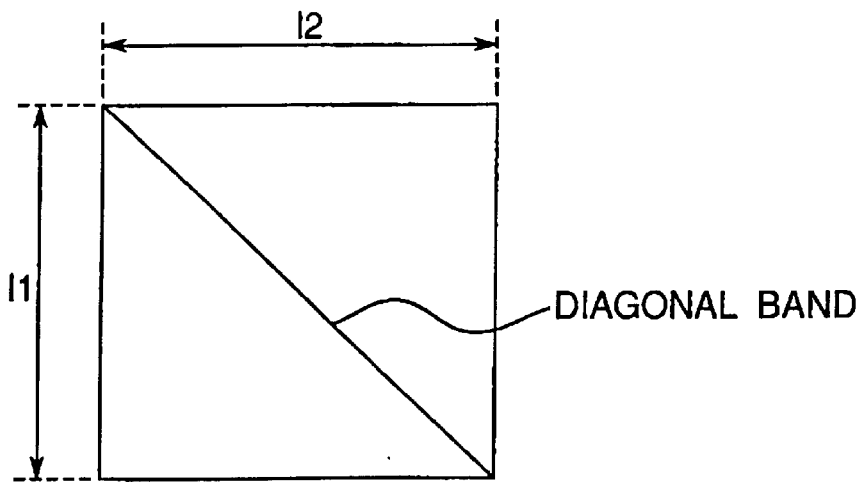
Figure 24:
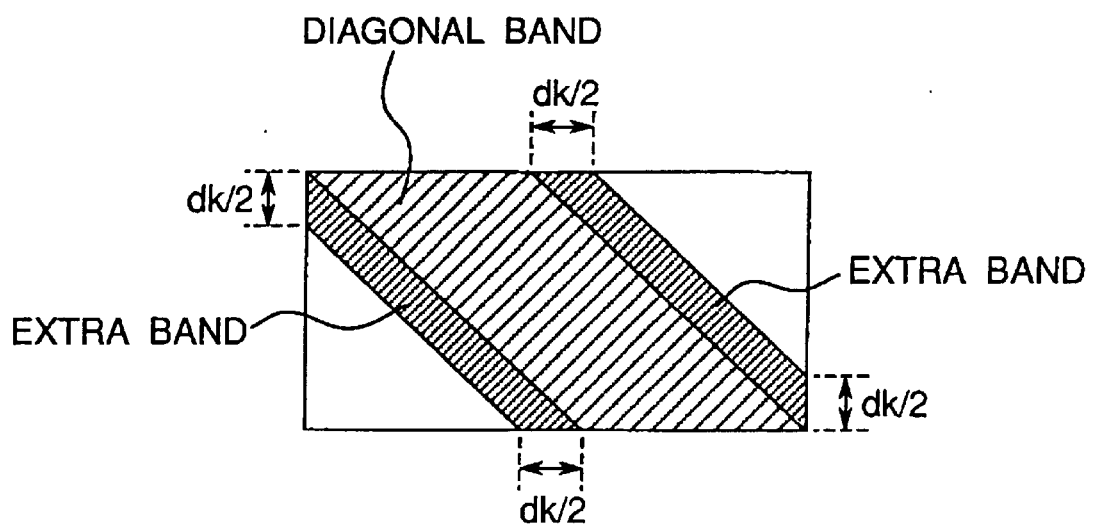
Figure 25:
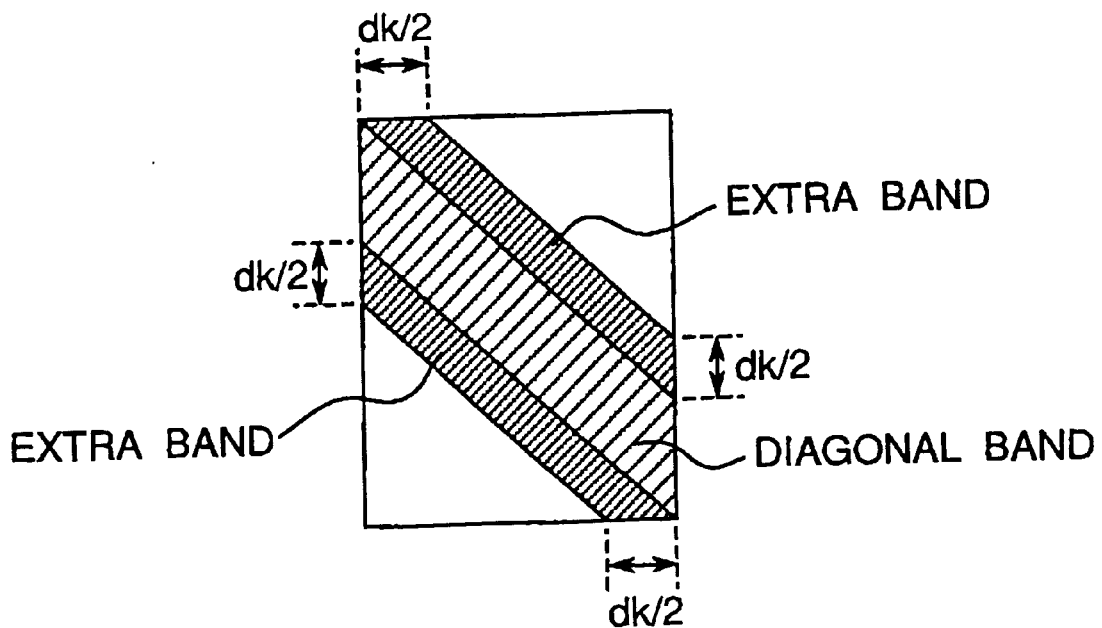
FIG. 25 is a schematic diagram showing a second example of the extra bands in a pseudo-distance matrix of the preferred embodiment.

In this connection, in a pseudo-distance matrix whose number of rows is 11 and number of columns is 12, if 11<12, then the diagonal band refers to a band of matrix elements which are present in a diagonal direction including diagonal elements in the pseudo-distance matrix and also including the number of columns equal to 12−11 in the rightward direction from the diagonal elements as shown in FIG. 21. Also, if 11>12, then the diagonal band refers to a band of matrix elements which are present in a diagonal direction including diagonal elements in the pseudo-distance matrix and also including the number of rows equal to 11−12 in the downward direction from the diagonal elements as shown in FIG. 22. Further, if 11=12, then the diagonal band refers to a band of matrix elements which are present in a diagonal direction including only diagonal elements in the pseudo-distance matrix as shown in FIG. 23. The two extra bands refer to two bands of matrix elements whose number of columns or number of rows is dk/2 on each of both sides of the diagonal band as shown in FIGS. 24 and 25, where the width of each extra band is computed and updated as dk/2 at step S26 of FIG. 12, and then, is used at steps of FIGS. 13 and 14.

The result of Prior Art Document 6 applies to pseudo distances used in the present preferred embodiment, and is therefore used to reduce the amount of computations of the two pseudo-distance matrices. The width of extra bands is obtained by trying to satisfy the coverage constraint with the value of the current pseudo distance in the other matrix.

Next, main components to be computed in the analogically similar word production process are described. Once -enough computation has been done in the pseudo-distance matrices, the paths are followed according to the analogically similar word production process, along which longest common subsequences are found, simultaneously in both pseudo-distance matrices, and letters are copied into the analogically similar word D. At each time, the positions in both pseudo-distance matrices must be on the same horizontal line, i.e., at the same position in the first letter string A, in order to ensure a right order while the analogically similar word D is built.

Determination of the paths is achieved by comparing a currently processed element (hereinafter, referred to as a current element) in the pseudo-distance matrix with its one-preceding three elements (horizontally one-preceding element, vertically one-preceding element, and diagonally one-preceding element, as schematic diagramed from the current element), according to the technique of the fifth prior art method. As a consequence, paths are followed from the end to the beginning of the letter string. The nine possible combinations (three directions in two pseudo-distance matrices) can be divided into two groups, one in which the directions are the same in both pseudo-distance matrices and the other in which the directions are different.

Now the analogically similar word production process is briefly described. First of all, the status parameter com (A, B, C, D) is initialized to a computed value of $$\{|A|-(\text{pdist}(A, B)+\text{pdist}(A, C))\} \quad (6).$$

Parameters $i_A$, and ic are current positions in the first letter string A, the second letter string B and the third letter string C, respectively. $\text{dir}_{AB}$ (or $\text{dir}_{AC}$) is the direction of the path in apseudo-distance matrix A×B (or pseudo-distance, matrix A×C) from the current position. In this case, the term "copy" means to set a letter from a letter string to a place of the analogically similar word D and to move it to the previous letter in that letter string.

Subsequently, an early termination in case of a detection failure is described. A complete computation of both pusedo-distance matrices is not necessary to detect a failure of analogically similar word production. A production failure is obvious when a letter in the first letter string A does not appear in the second letter string B or the third letter string C. This may be detected already before any computation of pseudo-distance matrices. Also, checking the coverage constraint allows the analogically similar word production process of present preferred embodiment to be ended as soon as non-satisfying moves have been performed.

According to the analogically similar word production process of present preferred embodiment as described above, a process for producing an analogically similar word x is described with respect to the following relational equation:

$$\text{like:unlike=known:}x \quad (7)$$

where it is assumed that the inputted first letter string is "like", the inputted second letter string is "unlike" and the inputted third letter string is "known".

An example of the analogically similar word production process is explained below. In the analogically similar word production process of present preferred embodiment, first of all, it is verified that all letters of the first letter string "like" are present either in the second letter string "unlike" or in the third letter string "known". Then, the computation of each element is done for the pseudo-distances matrices with a minimal computational cost, i.e., only the elements within the minimal diagonal band are computed. FIG. 7 is a table showing a limited pseudo-distance matrix resulting from computing the components within the diagonal band in the pseudo-distance matrix of FIG. 6. The symbol "·" in the pseudo-distance matrix of FIG. 7 denotes a component for which the value is not computed, i.e., for which the value does not need to be computed. Because a large number of "·" can be seen in FIG. 7 it is understood that the computational cost has been reduced considerably as compared with the computational cost of pseudo-distance matrices in FIG. 6.

Figure 8:
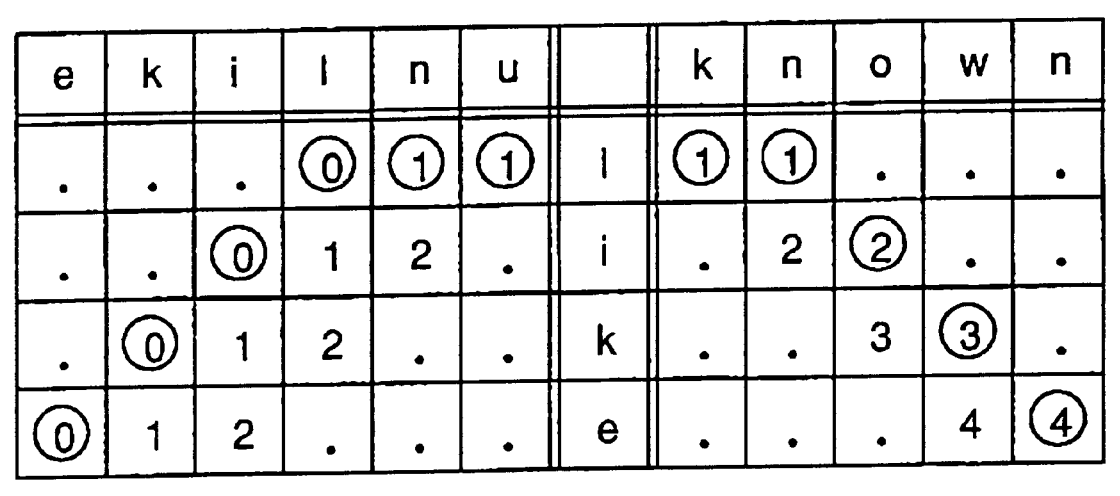

Subsequently, elements in the limited pseudo-distance matrix are used to verify the coverage constraint. FIG. 8 is a table showing a pseudo-distance matrix in which elements along the shortest paths are circled in the pseudo-distance matrix of FIG. 7. The analogically similar word production process of the present preferred embodiment of the present invention follows the path described by the circled values in both matrices. Referring to FIG. 8, this succession of moves triggers copied letters into an analogically similar word as shown in the following table.

TABLE 1

| $dir_{AB}$ | $dir_{AC}$ | copied letter |
|---|---|---|
| diagonal | diagonal | n |
| diagonal | diagonal | w |
| diagonal | diagonal | o |
| diagonal | diagonal | n |
| horizontal | horizontal | k |
| horizontal | diagonal | n |
| horizontal | diagonal | u |

As shown in the above table, the coverage constraint is verified at each step, and finally the analogically similar word x=unknown is outputted.

Trivial cases are, of course, solved by an algorithm such as:

$$A:A=A:x \Rightarrow x=A \quad (8)$$

or $$A:A=C:x \Rightarrow x=C \quad (9)$$

Further, by construction, A:B=C:x and A:C=B:x yield the same analogically similar word.

Next, a "reduplication"-and-"permutation" relation of a letter string in the analogical relation is explained. The prior-art example cannot be generate an analogically similar word having such a "reduplication" relation as the same letter string is reduplicated. However, for example, when it is desired to obtain a plural form in Indonesian, the following relation exists, as an example:

$$\text{orang:orang-orang=burung:}x \quad (10)$$

x burung-burung where "orang" in Indonesian means human being and its plural form is "orang-orang". Also, burung in Indonesian means bird and its plural form is "burung-burung". In such a relation, in order to generate an analogically similar word x, it is necessary to reduplicate the letter string. In this case, the prior-art algorithm yields an analogically similar word x=orang-burung, because preference is given to leave prefixes unchanged.

Also, permutation is not generated by present preferred embodiment. An example (q with a and u) in Proto-semitic is: yaqtilu:yuqtilu=qatal:qutal.

As a characteristic of the analogically similar word production process of present preferred embodiment, the analogically similar word production process performs computation only on a symbol level, and therefore applicable to any language. Accordingly, the analogically similar word production process of present preferred embodiment is language-independent. This is fortunate, as analogy in conventional linguistics certainly derives from a more general psychological operation, which seems to be universal among human beings. Later-described examples illustrate the language independence of present preferred embodiment.

Conversely, the symbols determine the granularity, or degree of precision, of analogies computed. Consequently, a commutation which is not reflected in the coding system will not be captured. This may be illustrated by a Japanese example in three different codings: the Japanese kanji/kana writing system, the Hepburn transcription and the official, strict recommendation (kunrei system). The following expression shows an example of using the Japanese kanji/kana writing system, the Hepburn transcription and the kunrei system:

(a) Kanji (Chinese Character)/Japanese Kana:

待つ(wait):待ちます(will wait)=働く(work):x $$x=\text{impossible to generate}, \quad (11)$$

(b) Hepburnian-system:

matsu:machimasu=hataraku:x $$x=\text{impossible to generate}, \quad (12)$$

and (c) Kunrei system:

matu:matimasu=hataraku:x $$x=\text{hatarakimasu}. \quad (13)$$

In the analogically similar word production process of present preferred embodiment, the algorithm cannot generate analogies in the kanji/kana and Hepburnian systems (kanji/kana: 働きます (will work in English), Hepburnian system: hatarakimasu (will work in English)), because the algorithm of present preferred embodiment cannot execute the elementary analogies: "つ : ち = く : き" in the kanji/kana system, and "tsu:chi=ku:ki" in the Hepburnian system, which are beyond the symbol level. However, if such analogical relations are previously defined and parametrize the process is done, it becomes possible for present preferred embodiment to generate such analogically similar words as shown above.

Below is explained the above-described analogically similar word production process to be executed in the analogically similar word production apparatus 100 of FIG. 1, particularly, an analogically similar word production process in the case where the edit unit is a letter and where "like", "unlike" and "known" are inputted as three letter strings in this order.

Figure 12:
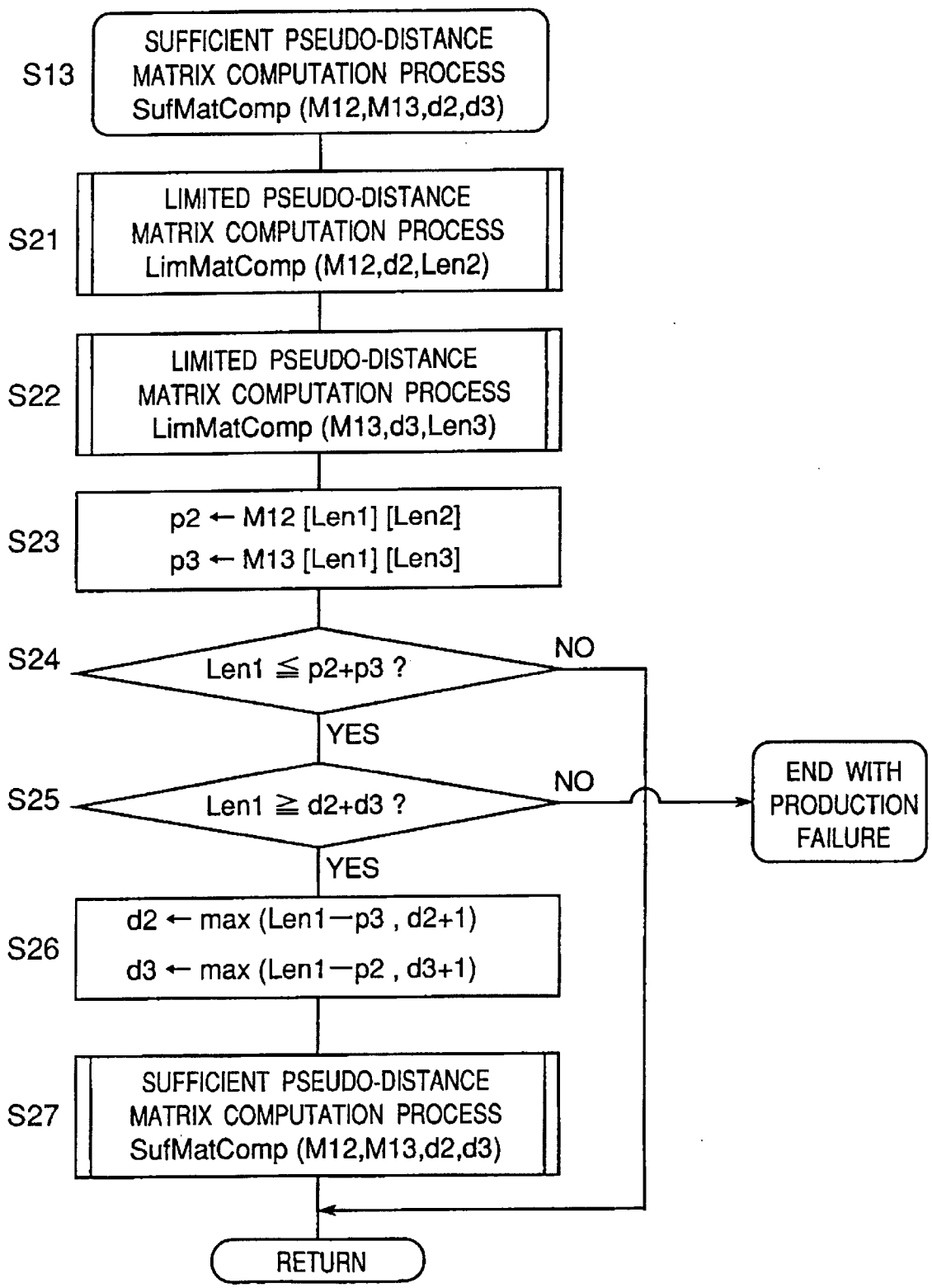
FIG. 12 is a flowchart showing a sufficient pseudo-matrix computation process of step S13 which is a subroutine of the preprocessing of FIG. 10.

With reference to FIG. 1, first of all, the preprocessing section 2 executes a preprocessing to compute sufficient information in the computation of two pseudo-distance matrices, by which the two pseudo-distance matrices are computed by the preprocessing section 2, and outputted and stored in the pseudo-distance matrix memory 10. The preprocessing section 2 executes a matrix initialization process to set positive infinite data to all the elements of both pseudo-distance matrices in the pseudo-distance matrix memory 10. Further, in order to compute sufficient information in the two pseudo-distance matrices stored in the pseudo-distance matrix memory 10, sufficient pseudo-distance matrices computation is executed in the preprocessing section 2. In this process, as shown in FIG. 12, two limited pseudo-distance matrix computations and one sufficient pseudo-distance matrix computation are executed.

A limited pseudo-distance matrix computing process LimMatComp does not compute all the matrix elements included in a pseudo-distance matrix, but only computes the elements in diagonal band and the extra bands of the pseudo-distance matrix. The elements which do not belong to the diagonal band and the extra bands are left unchanged and keep the largest value data during an initialization process InitMatrix as shown at step S95 of FIG. 11.

The production of a letter string analogically similar to three inputted letter strings can be done by computing all the matrix elements in the pseudo-distance matrices between a first inputted letter string and a second inputted letter string and between the first inputted letter string and a third inputted letter string. The purpose of the limited pseudo-distance matrix computing process LimMatComp is to compute only the sufficient information in the pseudo-distance matrices between the first inputted letter string and the second inputted letter string and between the first inputted letter string and the third inputted letter string for the production of a letter string analogically similar to the three inputted letter strings by computing only the matrix elements contained in the diagonal band and two extra bands in the pseudo-distance matrices between the first inputted letter string and the second inputted letter string and between the first inputted letter string and the third inputted letter string. Therefore, the process of the production of a letter string analogically similar to the three inputted letter strings by using the limited pseudo-distance matrix computing process LimMatComp is capable of executing a faster production of a letter string analogically similar to the three inputted letter strings by computing all the matrix elements contained in the pseudo-distance matrices between the first inputted letter string and the second inputted letter string and between the first inputted letter string and the third inputted letter string.

The values of the matrix elements computed by the limited pseudo-distance matrix computing process LimMatComp may differ from the values of the same matrix elements computed by a process in which all the matrix elements of the pseudo-distance matrix are computed. This is illustrated in FIGS. 6 and 7. In FIG. 6, the 3rd element of the 3rd line in the pseudo-distance matrix between the letter string "like" and the letter string "known" corresponding to the letter "k" in the letter string "like" and the letter "o" in the letter string "known" has a value of 2. However, the 3rd element of the 3rd line in the pseudo-distance matrix between the letter string "like" and the letter string "known" in FIG. 7 has a value of 3.

By using the pseudo-distance matrices as shown in FIG. 7, the highest number of letters from the first inputted letter string "like" which appear in the best order in the second inputted letter string "unlike" and the highest number of letters from the first inputted letter string "like" which appear in the best order in the third inputted letter string "known" can be obtained as follows.

Figure 11:
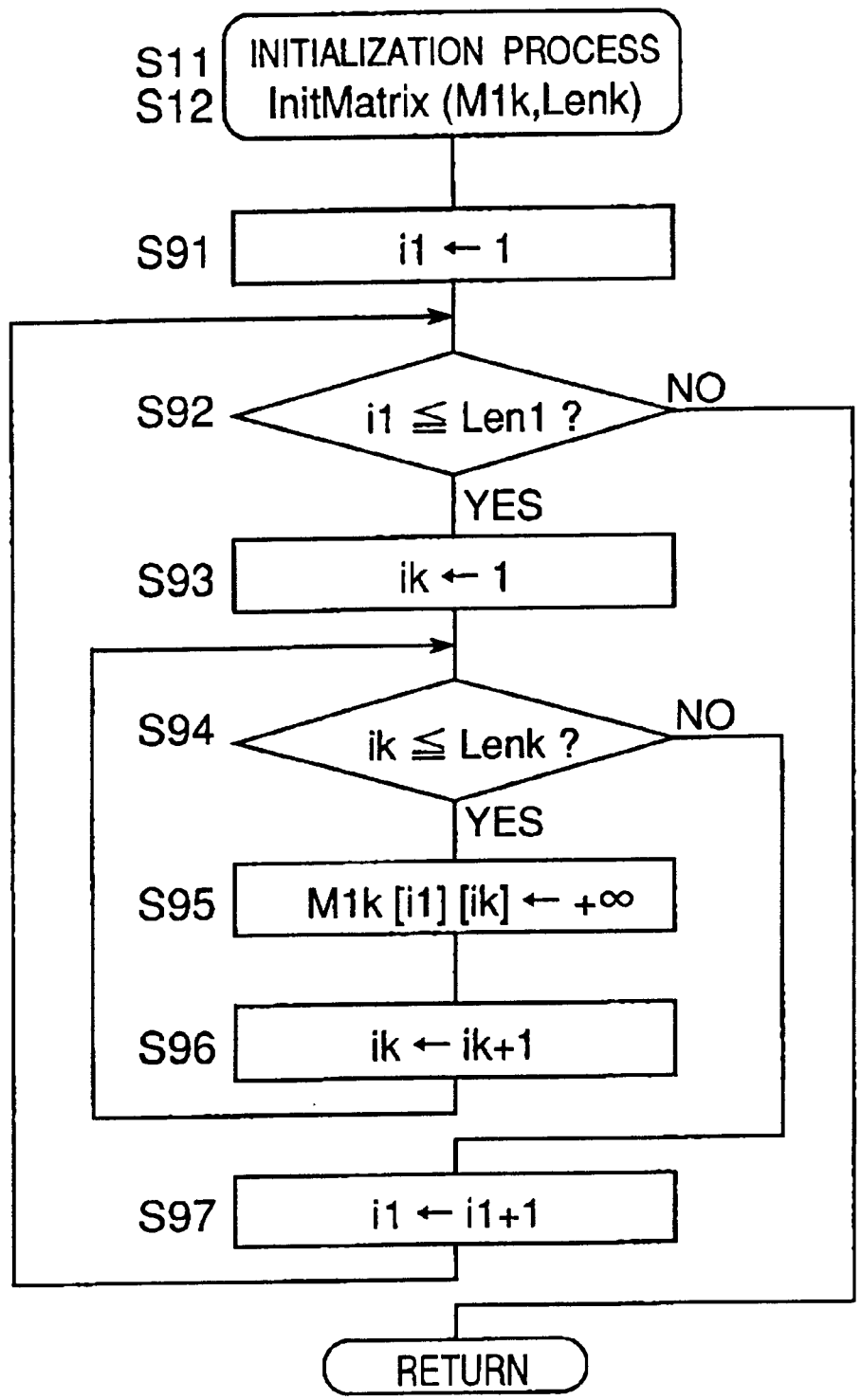
FIG. 11 is a flowchart showing matrix initialization processes of steps S11 and S12 which are subroutines of the preprocessing of FIG. 10.

First of all, each element of two pseudo-distance matrices is set to positive infinite data by the matrix initialization process of FIG. 11. Further, the sufficient pseudo-distance matrix computation process shown in FIG. 12 computes a sufficient number of elements in the two pseudo-distance matrices as follows.

First of all, it can be found in the limited pseudo-distance matrix process that a diagonal-band value of 3 has to be computed in this first step for the computation of the elements of the pseudo-distance matrix between the first inputted letter string "like" and the second inputted letter string "unlike",as the difference 2 between the number of letters 6 of the second letter string "unlike" and the number of letters 4 of the first letter string "like" plus one is equal to 3.

Further, each element in the diagonal band of a width of 3 in the pseudo-distance matrix between the first and second inputted letter strings are computed as follows. First of all, the first letter "l" of the first letter string "like" and the first letter "u" of the second letter string "unlike" are found to be unequal, and therefore the element corresponding to the highest number of a substring which is one letter of the first letter string "like" starting from the letter "l" and a substring which is one letter of the second letter string "unlike" starting from "u" is set to a value of 1.

Then, the second element in the first row of the pseudo-distance matrix is computed as a minimum value of one between the value of one of the one-preceding element in the same first row and the comparison result value (functional value) of one of the function true attributable to the fact that the first letter "l" of the first inputted letter string "like" and the second letter "u" of the second inputted letter string "unlike" are not equal to each other. In this case, the function true (f) is a function which represents one when a condition f is satisfied and which represents zero if not.

Further, the third element in the first row of the pseudo-distance matrix is computed as the minimum value of zero between the value of one of the second element which is the value of the one-preceding element in the same first row, and the comparison result value (functional value) of zero of the function true which is attributable to the fact that the first letter "l" of the first letter string "like" and the third letter "l" of the second letter string "unlike" are equal to each other.

Further, the second element in the second row of the pseudo-distance matrix is set to a minimum value of 2 between a sum value of two which results from adding up the value of one of the first element that is the value of the one-preceding element in the one-preceding first row and the comparison result value (functional value) of one of the function true attributable to the fact that the second letter "i" of the first letter string "like" and the second letter "n" of the second letter string "unlike" are not equal to each other, and another sum value of two which results from adding one to the value of one of the same second element in the one-preceding first row. Accordingly, the second element in the second row is set to a numerical value of two.

Next, the third element in the second row of the pseudo-distance matrix is set to a minimum value of two between a sum value which results from adding up the value of two derived from adding the result value (functional value) of one of the function true attributable to the fact that the second letter "i" of the first letter string "like" and the third letter "l" of the second letter string "unlike" are not equal to each other, to the value of one of the second element which is the one-preceding element in the one-preceding row, another sum value of two which results from adding one to the value of one of the same third element in the one-preceding row, and the value of two of the one-preceding second element in the same second row.

Figure 14:
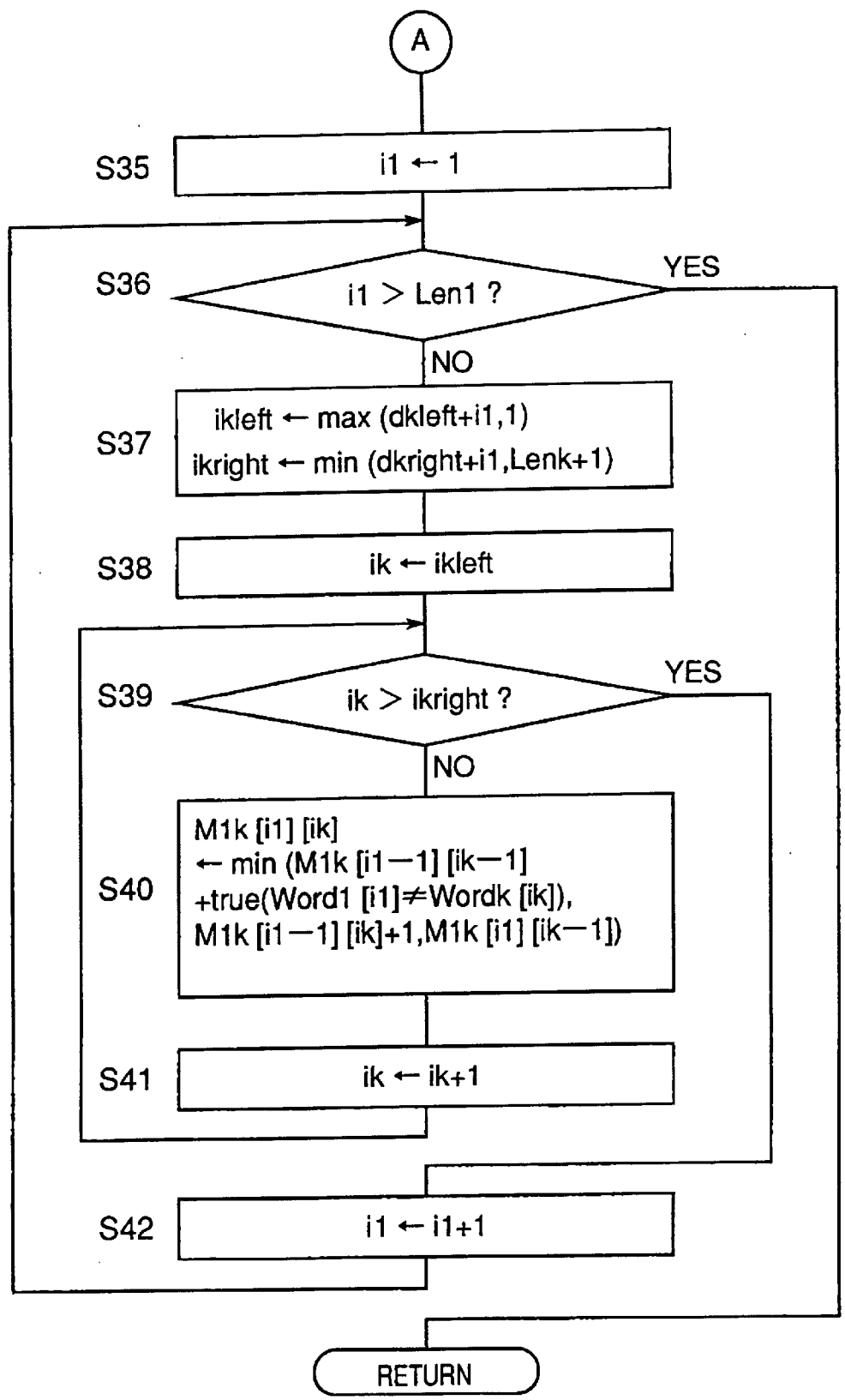
FIG. 14 is a flowchart showing a second part of the limited pseudo-distance matrix computation process of step S21 which is a subroutine of the sufficient pseudo-matrix computation process of FIG. 12.

Accordingly, the ik-th (ik=1, 2, . . . , number of letters of the k-th letter string) element in the il-th (il=1, 2, . . . , number of letters in the first letter string) row in the diagonal band with a width of 3 in the pseudo-distance matrix between the first inputted letter string "like" and the second inputted letter string "unlike" is assigned a value which is minimum among a sum value resulting from adding either zero or one to the value of the one-preceding (ik−1)-th element in the (il−1)-th row one-precedent to the row of the current element, where zero is added if the il-th letter of the first letter string "like" and the ik-th letter of the second letter string "unlike" are equal to each other while one is added if not, a sum value resulting from adding one to the value of the same ik-th element in the one-preceding (il−1)-th row of the pseudo-distance matrix, and the value of the one-preceding (ik−1)-th element in the same il-th row of the pseudo-distance matrix, as described at step S40 of FIG. 14 and as shown in FIG. 7. Accordingly, the 6th element in the fourth row of the pseudo-distance matrix between the first inputted letter string "like" and the second inputted letter string "unlike" is set to a numerical value of 0, as a result of executing the process as described above.

Also, the ik-th element in the il-th row in the diagonal band having a width of two representing a value resulting from adding one to the difference between the number of letters, five, of the third inputted string "known" and the number of letters, four, of the first inputted letter string "like" in a pseudo-distance matrix between the first inputted letter string "like" and the third inputted letter string "known" is assigned a value which is minimum among a sum value resulting from adding either zero or one to the value of the one-preceding (ik−1)-th element in the one-preceding (il−1)-th row, where zero is added if the il-th letter of the first letter string "like" and the ik-th letter of the third letter string "known" are equal to each other while one is added if not, a sum value resulting from adding one to the value of the same ik-th element in the one-preceding (il−1)-th row of the pseudo-distance matrix, and the value of the one-preceding (ik−1)-th element in the same il-th row of the pseudo-distance matrix, as described at step S40 of FIG. 14 and as shown in FIG. 7. Accordingly, the fifth element in the fourth row of the pseudo-distance matrix between the first inputted letter string "like" and the third inputted letter string "known" is set to a numerical value of four, resultantly. In this way, the preprocessing of calculating the value of each element in the two pseudo-distance matrices.

Next, an analogically similar word production process for producing an analogically similar word based on two pseudo-distance matrices having the elements computed in the preprocessing is explained. First of all, it can be found that the letter number, four, in first inputted letter string "like" is less than or equal to the sum value of four resulting from adding up the value of zero of the sixth element in the fourth row of the pseudo-distance matrix between the first and second inputted letter strings "like" and "unlike" and the value of four of the fifth element in the fourth row of the pseudo-distance matrix between the first and second letter strings "like" and "known", meaning that a sufficient number of elements have been computed in the pseudo-distance matrices, so that the program flow goes back from the sufficient pseudo-distance computation process to the original process of preprocessing and that the program flow goes back from the preprocessing process to the original analogically similar word production process, where the program flow proceeds to the next process. The analogically similar word production process proceeds as follows.

First of all, positions i1, i2 and i3 in the three imputted letter strings are initialized to the respective number of letters of the three inputted letter strings. It is noted here that a position in a letter string refers to a parameter representing which place in order a letter under processing falls upon. Then, the position i4 in the analogically similar word which is the letter string to be produced is initialized to twice the maximum value out of the numbers of letters in the three inputted letter strings.

Further, the number of common letters is initialized to a value of zero which is the difference between the number of letters, four, in the first inputted letter string "like" and the sum value of four resulting from adding up the value zero of the sixth element in the fourth row of the pseudo-distance matrix between the first and second inputted letter strings "like" and "unlike" and the value four of the fifth element in the fourth row of the pseudo-distance matrix between the first and third inputted letter strings "like" and "known".

Then, the direction of movement is found to be diagonal in the pseudo-distance matrix between the first and second inputted letter strings "like" and "unlike" as the value of zero of the 6th element of the fourth row is equal to the value of zero of the fifth element of the third row plus the comparison result (functional value) value of zero of the function true of the fourth letter "e" of the first letter string "like" and the sixth letter "e" of the second letter string "unlike".

Also, the direction of movement is found to be diagonal in the pseudo-distance matrix between the first and third inputted letter strings "like" and "known" as the value of four of the fifth element of the fourth row is equal to the sum value resulting from adding up the value of three of the fourth element of the third row plus the comparison result (functional value) value of zero of the function true of the fourth letter "e" of the first letter string "like" and the fifth letter "n" of the third letter string "known".

Hence, it is found that the two directions in both matrices are equally diagonal, and thus the process proceeds in the same-direction process, which proceeds as follows.

First of all, it is found that both current positions in the second and third inputted letter strings are not equal to zero and that the fourth letter "e" of the first letter string "like" and the sixth letter "e" of the second letter string "unlike" are equal to each other. Because it is found that the fourth letter "e" of the first letter string "like" and the fifth letter "n" of the third letter string "known" are not equal to each other, and that the fourth letter "e" of the first letter string "like" and the sixth letter "e" of the second inputted letter string "unlike" are equal to each other, the last letter of the analogically similar word produced and outputted is set to a letter value "n" of the current letter from the third inputted letter string "known".

Further, all current positions of the three inputted letter strings and of the produced and outputted analogically similar word are decremented by a decrement of one, and then, the program flow returns to the original analogically similar word production subroutine.

Accordingly, it is further found that the directions of movements in the two pseudo-distance matrices are both diagonal, so that the last but one letter of the produced and outputted analogically similar word is set to the fourth letter "w" of the third inputted letter string "known". Then, it is further found that the directions of movements in the two pseudo-distance matrices are both diagonal so that the last but two letter of the produced and outputted analogically similar word is set to the third letter "o" of the third inputted letter string "known", and then it is further found that the directions of movements in the two pseudo-distance matrices are both diagonal, so that the last but three letter of the produced and outputted analogically similar word is set to the second letter "n" of the third inputted letter string "known", and then it is further found that the directions of movements in the two pseudo-distance matrices are both diagonal, so that the last but four letter of the produced and outputted analogically similar word is set to the first letter "k" of the third inputted letter string "known", and then it is further found that the direction of movement in the pseudo-distance matrix between the first and second letter strings is horizontal and that the direction of movement in the pseudo-distance matrix between the first and third letter strings is horizontal, so that the last but five letter of the produced and outputted analogically similar word is set to the second letter "n" of the second inputted letter string "unlike", and then it is further found that the direction of movement in the pseudo-distance matrix between the first and second letter strings is horizontal and that the direction of movement in the pseudo-distance matrix between the first and third letter strings is diagonal, so that the last but six letter of the produced and outputted analogically similar word is set to the first letter "u" of the second inputted letter string "unlike", and as a result, the outputted analogically similar word is set to "unknown".

Figure 9:
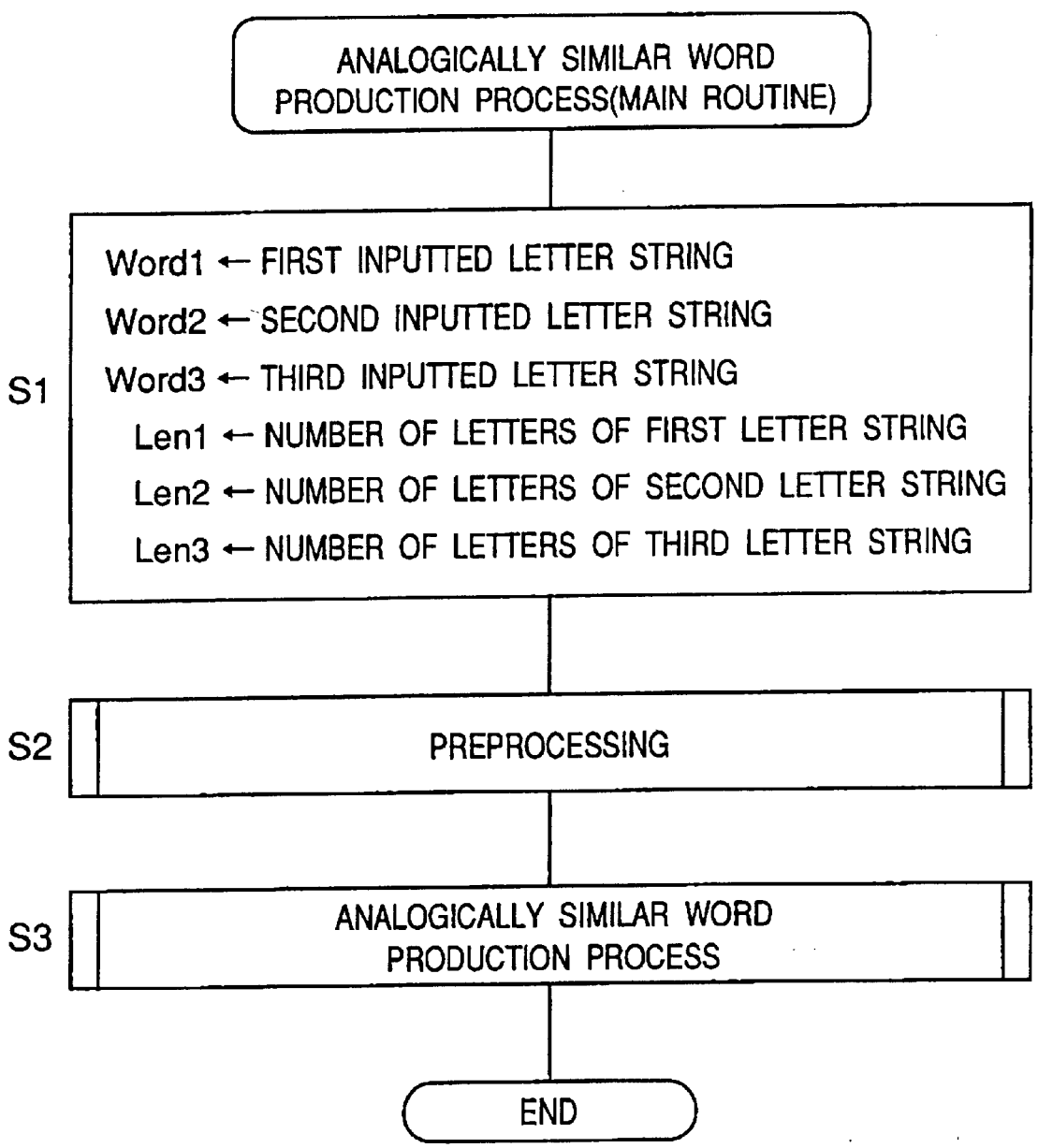
FIG. 9 is a flowchart showing an analogically similar word production process (main routine) which is executed by a CPU 1 of the analogically similar word production apparatus of FIG. 1.

Next, the above-described analogically similar word production apparatus is explained with reference to the flowchart. FIG. 9 is a flowchart showing the analogically similar word production process to be executed by the CPU 1 of the analogically similar word production apparatus 100 shown in FIG. 1.

Referring to FIG. 9, first of all, in step S1, three letter strings (i.e., words) inputted by means of a keyboard 21 are set to data Word1, Word2 and Word3, respectively, and the numbers of letters (lengths) of the first letter string Word1, the second letter string Word2 and the third letter string Word3 are set to data Len1, Len2 and Len3, respectively.

Then, after preprocessing process is executed in the preprocessing section 2 in step S2, an analogically similar word production process is executed by the analogically similar word production section 5 in step S3. In the present preferred embodiment, no argument to be used in each subroutine is indicated in parentheses ( ) following the process name, as data Word1, Word2, Word3 and data Len1, Len2 and Len3 are variables valid in each subroutine like global variables used in a language such as FORTRAN, BASIC or the like.

Figure 10:
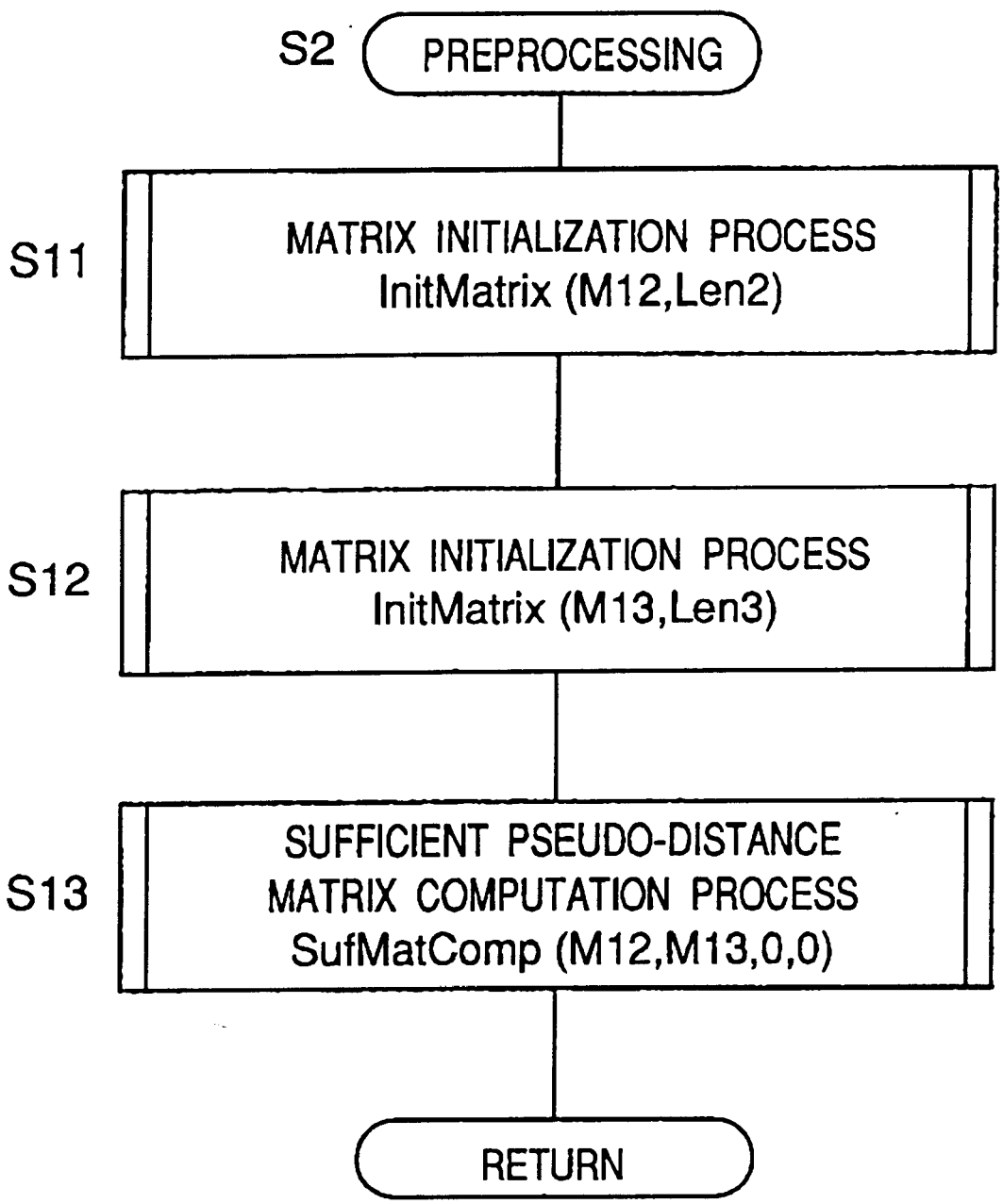
FIG. 10 is a flowchart showing a preprocessing of step S2 which is a subroutine of the analogically similar word production process (main routine) of FIG. 9.

FIG. 10 is a flowchart showing the preprocessing of step S2 which is a subroutine in the main routine of FIG. 9. This preprocessing is a process for, based on the three letter strings (words) inputted with the keyboard 21, computing and storing the followings into the pseudo-distance matrix memory 10:

(a1) each element of a pseudo-distance matrix M12 between each partial string of the first letter string Word1, starting from its beginning up to its end, and each partial string of the second letter string Word2, starting from its beginning up to its end; and (a2) each element of a pseudo-distance matrix M13 between each partial string of the first letter string Word1, starting from its beginning up to its end, and each element of the third letter string Word3, starting from its beginning up to its end.

Referring to FIG. 10, first of all, a matrix initialization process InitMatrix (M12, Len2) for initializing values of individual elements of the pseudo-distance matrix M12 to an infinitely high positive value is executed in step S11, then a matrix initialization process InitMatrix (M13, Len3) for initializing values of individual elements of the pseudo-distance matrix M13 to an infinitely high positive value, is executed in step S12 and further a sufficient pseudo-distance matrix computation process SufMatComp (M12, M13, 0, 0) for computing sufficient pseudo-distance values is executed in step S13, then, the program flow returns to the original main routine. In this specification, for example, in the matrix initialization process InitMatrix (M12, Len2), InitMatrix is a process name and (M12, Len2) is an argument for executing the subroutine process.

FIG. 11 is a flowchart showing a matrix initialization process of steps S11 and S12 which is a subroutine of the preprocessing of FIG. 11. In the case of the matrix initialization process in step S11 of FIG. 10, k=2, and in the case of the matrix initialization process in step S12 of FIG. 10, k=3.

Referring to FIG. 11, first of all, the value of a parameter i1 is initialized to one in step S91, and thereafter it is decided in step S92 whether or not i1≦Len1. If i1>Len1, it is decided that the matrix initialization process has been completed, and the program flow returns to the preprocessing of FIG. 10. If i1≦Len1 in step S92, the parameter ik is initialized to 1 in step S93, and thereafter it is decided in step S94 whether or not ik≦Lenk. If ik>Lenk in step S94, the program flow proceeds to step S97, where the parameter i1 is set by being incremented by one and the program flow returns to step S92. On the other hand, if ik≦Lenk, infinitely high positive data is substituted into the (ik)-th element Mlk[i1][ik] of the (i1)-th row in the pseudo-distance matrix Mlk in step S95. Then, the parameter ik is set by being incremented by one in step S96 and thereafter the program flow proceeds to step S94.

FIG. 12 is a flowchart showing a sufficient pseudo-distance matrix computation process of step S13 which is a subroutine of the preprocessing of FIG. 10.

Referring to FIG. 12, first of all, a limited pseudo-distance computation process LimMatComp (M12, d2, Len2) is executed in step S21, where an absolute value of the difference between the number of rows and the number of letters per row in the pseudo-distance matrix M12 representing the paeudo distances between all partial strings of the first letter string Word1, from its beginning up to its end, and all partial strings of the second letter string Word2, from its beginning up to its end, is added to values of elements in the diagonal band and an extra band of a length limited by d2. Then, similarly, a limited pseudo-distance computation process LimMatComp (M13, d3, Len3) is executed in step S22, where an absolute value of the difference between the number of rows and the number of letters per row in the pseudo-distance matrix M13 representing the pseudo distances between all partial strings of the first letter string Word1, from its beginning up to its end, and all partial strings of the third letter string Word3, from its beginning up to its end, is added to values of elements in the diagonal band and an extra band of a length limited by d3. Further, in step S23, the value of the last element in the last row of the pseudo-distance matrix representing the pseudo distance between the first letter string Word1 and the second letter string Word2 is substituted into a parameter p2, and similarly the value of the last element in the last row of the pseudo-distance matrix representing the pseudo distance between the first letter string Word1 and the second letter string Word3 is substituted into a parameter p3.

Then, it is decided in step S24 whether or not the number of letters Len1 of the first inputted letter string Word1 is less than or equal to the summation of the parameter p2 and the parameter p3. In this case, if Len1>p2+p3, it means that a sufficient number of values have been calculated in the pseudo-distance matrices M12 and M13, where the program flow returns to the preprocessing of FIG. 10 which is the original subroutine. If Len1≦p2+p3, the program flow goes to step S25, where it is decided whether or not the number of letters of the first inputted letter string Word1 is greater than or equal to the summation of the parameter d2 and the parameter d3.

If Len1<d2+d3, it means that letters of the first letter string Word1 can be found neither in the second letter string Word2 nor in the third letter string Word3, meaning that the process cannot produce an analogically similar word from the three inputted letter strings inputted in a predetermined order, the program flow ends with a failure. On the other hand, if Len1≧d2+d3 in step S25, the program flow goes to step S26, where a maximum value between a difference obtained by subtracting the temporary pseudo distance p3 between the first letter string Word1 and the third letter string Word3 from the number of letters Len1 of the first letter string Word1, and a value obtained by adding one to the parameter d2, is substituted into the parameter d2, and similarly, a maximum value between a value obtained by subtracting the temporary pseudo distance between the first letter string Word1 and the second letter string Word2 from the number of letters Len1 of the first letter string Word1, and a value obtained by adding one to the parameter d3, is substituted into d3. Then, the sufficient pseudo-distance matrix computation process SufMatComp (M12, M13, d2, d3) is executed again in step S27, and thereafter the program flow returns to the original process.

Figure 13:
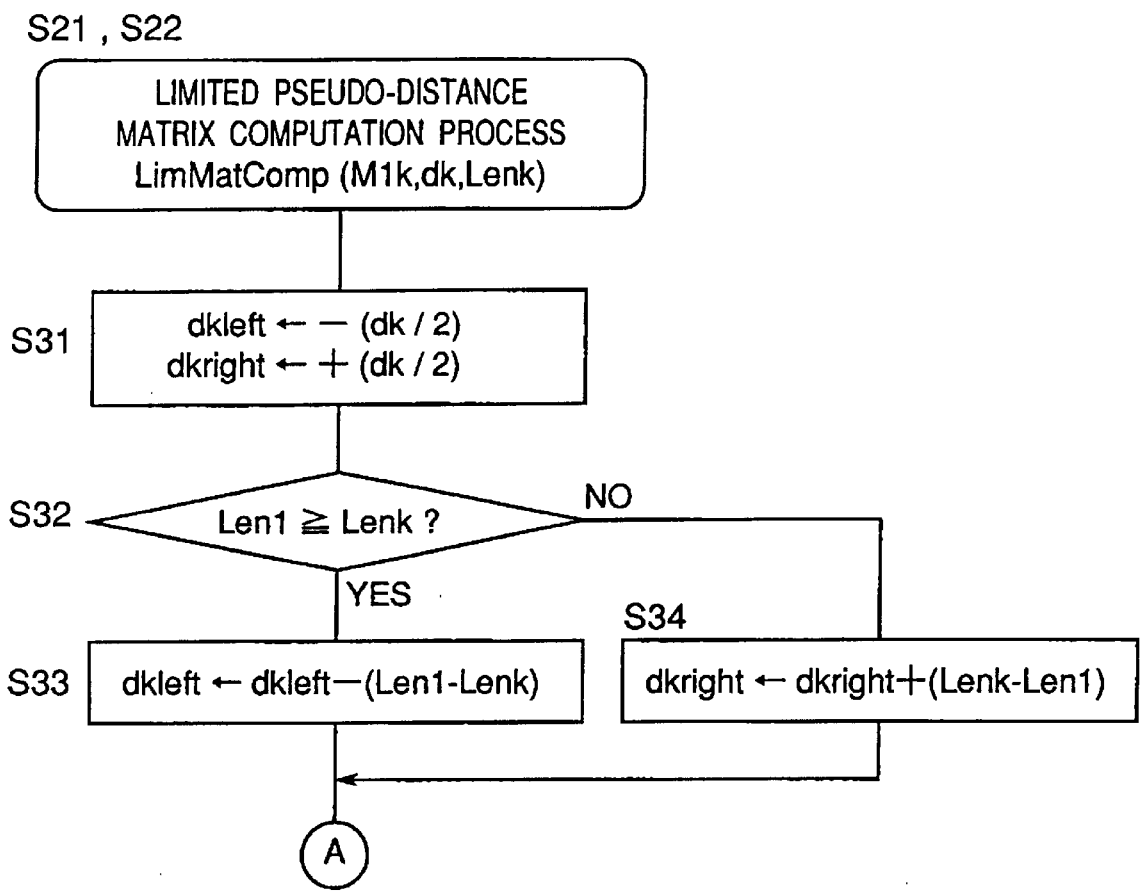
FIG. 13 is a flowchart showing a first part of a limited pseudo-distance matrix computation process of step S21 which is a subroutine of the sufficient pseudo-matrix computation process of FIG. 12.

FIGS. 13 and 14 are flowcharts showing a limited pseudo-distance matrix computation process of steps S21 and S22 which are a subroutine of the sufficient pseudo-distance matrix computation process in FIG. 12. In the case of the limited pseudo-distance computation process in step S21 of FIG. 12, k=2, and in the case of the limited pseudo-distance computation process in step S22 of FIG. 12, k=3.

Referring to FIG. 13, first of all, a parameter dkleft is initialized to a value of (−dk/2) and a parameter dkright is initialized to a value of (dk/2), and thereafter it is decided in step S32 whether or not Len1≧Lenk. If the number of unit letters Len1 of the first inputted letter string Word1 is greater than or equal to the number of letters Lenk of another inputted letter string Wordk, a value obtained by subtracting the number of letters Lenk from the number of letters Len1 is subtracted from the parameter dkleft and the computation result is substituted into the parameter dkleft, the program flow then going to step S35 of FIG. 14. On the other hand, if Len1<Lenk in step S32, the parameter dkright is updated by adding thereto a value obtained by subtracting the number of letters Len1 from the number of letters Lenk, the program flow then going to step S35 of FIG. 14.

In step S35 of FIG. 14, the value of the parameter i1 is initialized to one. Then, it is decided in step 36 whether or not i1>Len1. If i1>Len1, it means that all the elements of the pseudo-distance matrix Mlk have been processed, where the program flow returns to the sufficient pseudo-distance matrix computation process of FIG. 12 which is the original subroutine. On the other hand, if i1≦Len1, the program flow goes to step S37, where the value of the parameter ikleft is assigned a maximum value between the summation of the parameter dkleft and the parameter i1, and a numerical value of 1 while the value of the parameter dkright is assigned a minimum value between the summation of parameter dkright and a value of the parameter Lenk plus a numerical value of one.

Subsequent to the step S37, the value of the parameter ikleft is initialized to the parameter ik in step s38. Then it is decided in step S39 whether or not ik>ikright. If ik>ikright, it means that no sufficient elements exist in the current row of the pseudo-distance matrix Mlk, so that the program flow goes to step S42, where the next parameter i1 is set by being incremented by one so that the process in the next row is executed, and the program flow returns to step S36. On the other hand, if ik≦ikright, the program flow goes to step S40, where, from the followings:

(a) a summation of the value of a one-preceding element Mlk[i1−1][ik−1] in the one-preceding (i1−1)-th row, and a functional value of the function true (Word1[i1] ≠Wordk[ik]);

(b) a summation of the value Mlk[i1−1][ik] of the ik-th element of the (i1−1)-th row which is precedent to the pseudo-distance matrix Mlk, and a numerical value of 1; and (c) a value Mlk[i1][ik−1] of the one-preceding (ik−1)-th element of the i1-th row of the pseudo-distance matrix Mlk, a minimum value is set to the value Mk1[i1][ik] of the ik-th element of the i1-th row in the pseudo-distance matrix Mlk. Then the parameter ik is incremented by one in step S41, and the program flow returns to step S39.

Figure 15:
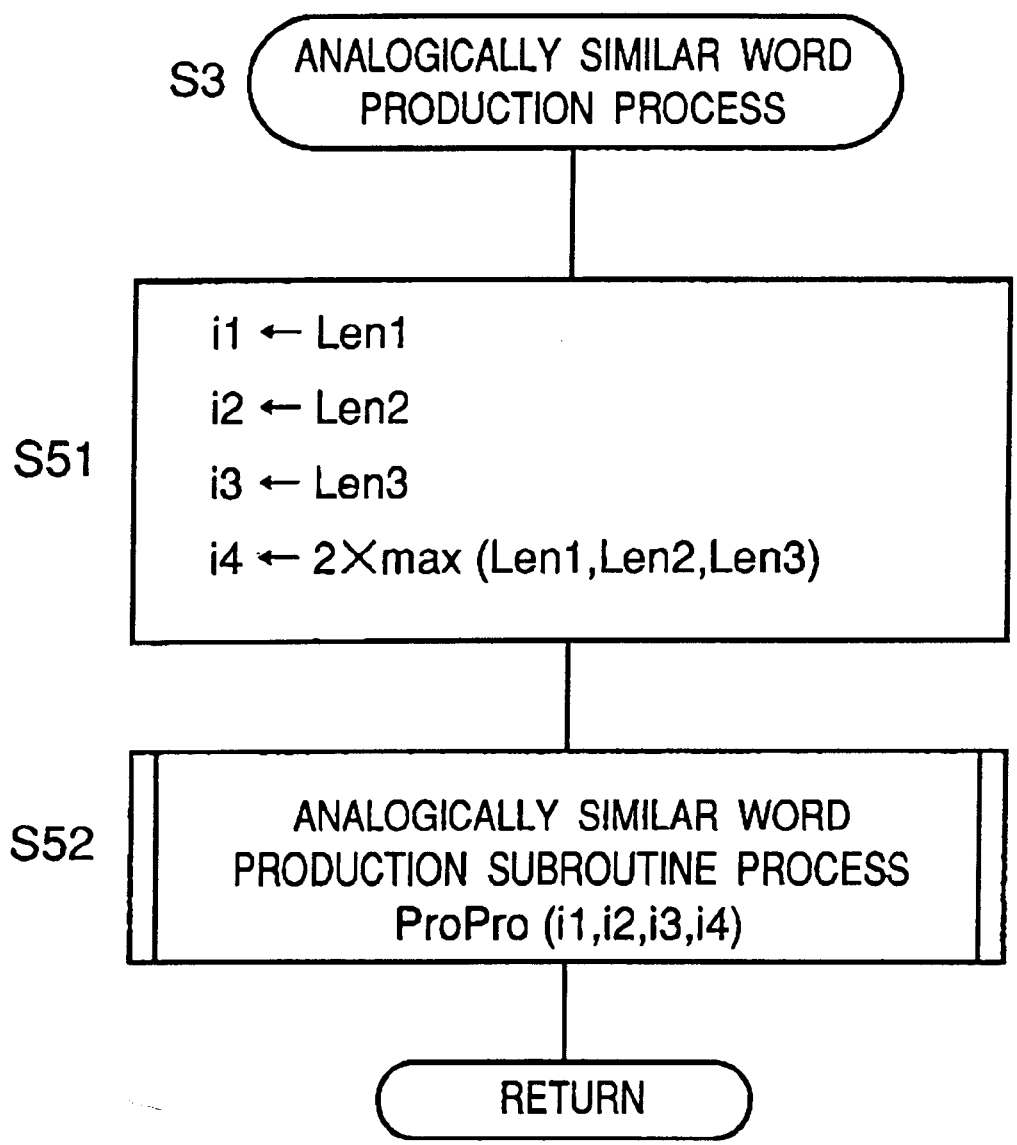
FIG. 15 is a flowchart showing an analogically similar word production process of step S3 which is a subroutine of the analogically similar word production process (main routine) of FIG. 9.

FIG. 15 is a flowchart showing the analogically similar word production process of step S3 which is a subroutine of the analogically similar word production process of FIG. 9. Referring to FIG. 9, first of all, the parameter i1 is initialized to the number of units Len1 of the first inputted letter string Word1, then the parameter i2 is initialized to the number of letters Len2 of the second inputted letter string Word2, and thereafter the parameter i3 is initialized to the number of letters Len3 of the third inputted letter string Word3, and further the parameter i4 is initialized to twice the largest number of letters out of the numbers of letters of the three inputted letter strings, the first inputted letter string Word1, the second inputted letter string Word2 and the third inputted letter string Word3, in step S51. Then, after executing an analogically similar word production subroutine process ProPro in the analogically similar word production section 5 in step S52, the program flow returns to the analogically similar word production process (main routine) of FIG. 9, where the analogically similar word production process is ended.

Figure 16:
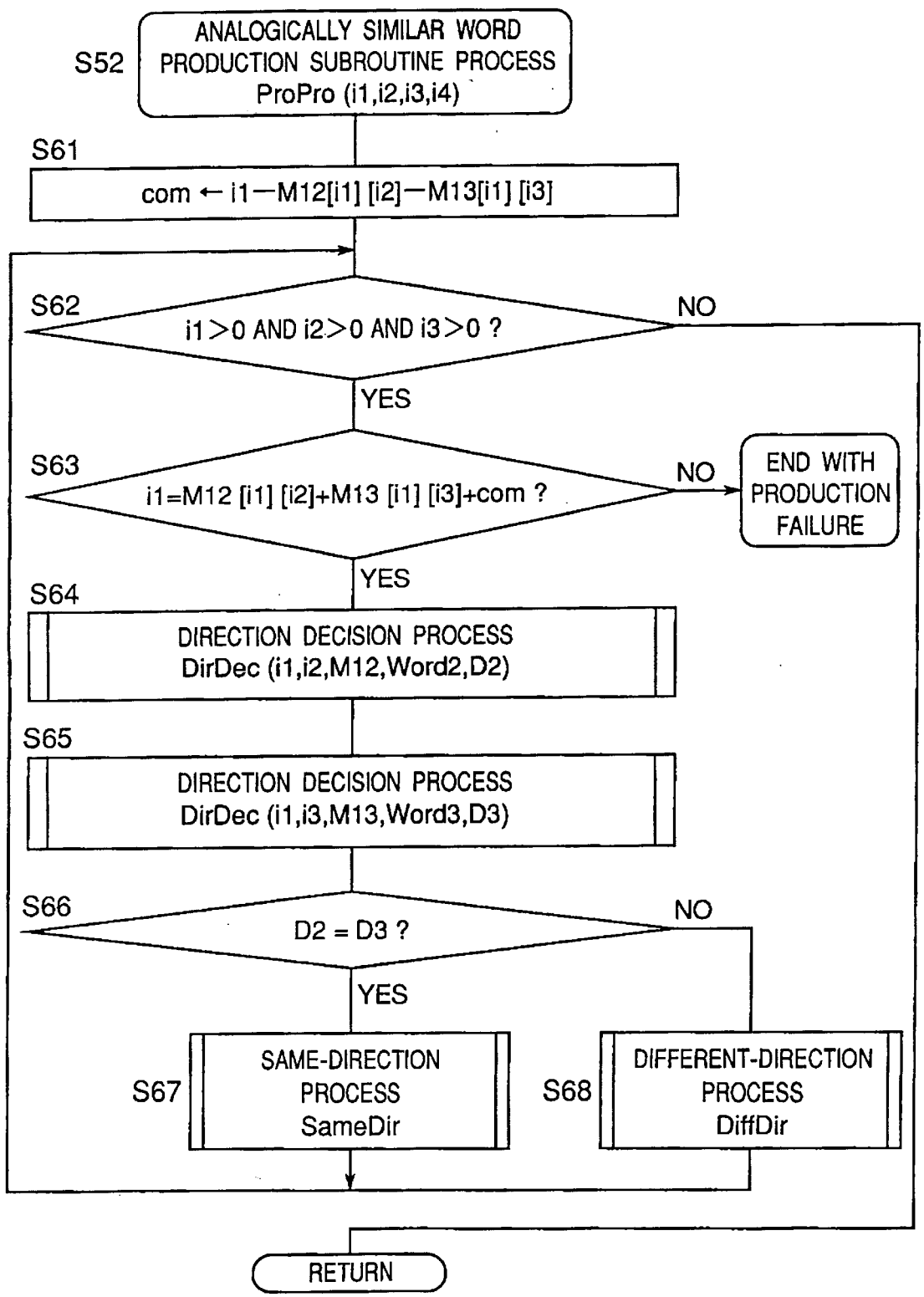
FIG. 16 is a flowchart showing an analogically similar word production process of step S52 which is a subroutine of the analogically similar word production process of FIG. 15.

FIG. 16 is a flowchart showing the analogically similar word production subroutine of step S52 which is a subroutine of the analogically similar word production process ProPro (i1, i2, i3) of FIG. 15. Referring to FIG. 16, first of all, the parameter com is initialized to a value obtained by subtracting, from the value of the parameter i1, a sum value obtained by adding the value of the i3-th element M13[i1] [i3] of the i1-th row of the pseudo-distance matrix M13 to the value of the i2-th element M12[i1][i2] of the i1-th row of the pseudo-distance matrix M12 in step S61.

Then it is decided in step S62 whether or not values of all the parameters i1, i2 and i3 are greater than zero. If the values of all the parameters i1, i2 and i3 are not greater than zero, it means that at least one letter string has been completely processed by the processes of steps S63 to S68, so that the program flow returns to the analogically similar word production process of FIG. 15 which is the original subroutine. On the other hand, if the values of all the parameters i1, i2 and i3 are greater than zero in step S62, the program flow goes to step S63, where it is decided whether or not the value of the parameter i1 is equal to a sum value obtained by adding the value m13[i1][i3] of the i3-th element of the i1-th row of the pseudo-distance matrix M13 and the value of the parameter com to the value M12[i1][i2] of the i2-th element of the i1-th row of the pseudo-distance matrix M12. If it is not equal in step S63, it means that there does not exist an analogically similar word to the three inputted letter strings in a predetermined order, implying that the process cannot produce such a letter string, where the program, deciding that an analogically similar word cannot be produced, ends with a failure of the production process. Also, if the equality holds in step S63, the program flow goes to step S64. In step S64, a direction decision process DirDec (i1, i2, M12, Word2, D2) is executed and a computation result of the process is set to the parameter D2. Then, in step S65, a direction process DirDec (i1, i3, M13, Word3, D3) is executed and a computation result of the process is set to the parameter D3, where the program flow goes to step S66.

It is decided in step S66 whether the values of the two parameters D2 and D3 are equal to each other. If the two parameters D2 and D3 are equal to each other, it is decided that the parameters are of the same direction and then the program flow goes to step S67, where a same-direction process SamDir is executed and the program flow returns to step S62. On the other hand, if the two parameters D2 and D3 are not equal to each other in step S66, it is decided that the parameters are not of the same direction and the program flow goes to step S68, where a different-direction process DiffDir is executed and the and the program flow returns to step S62.

Figure 17:
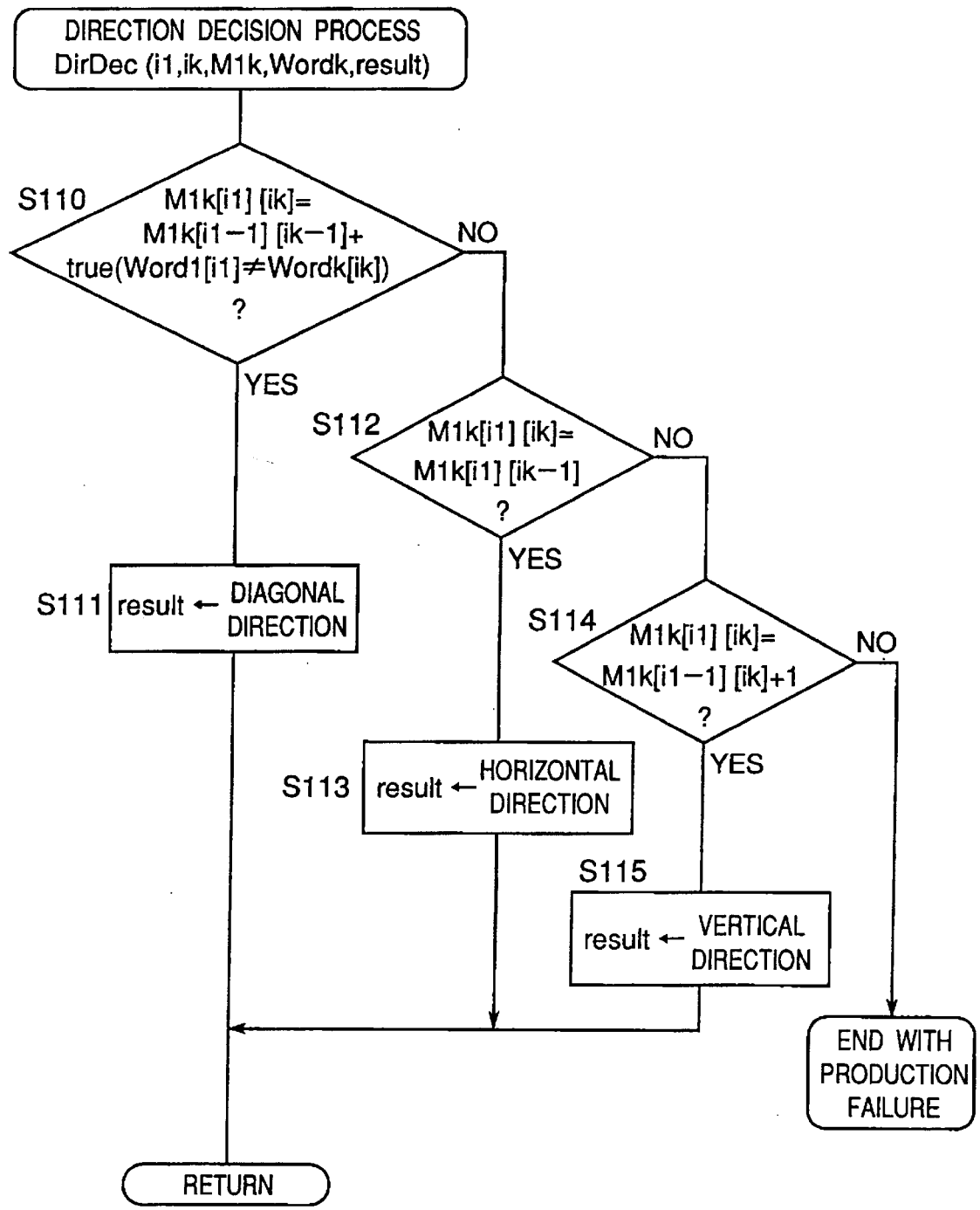
FIG. 17 is a flowchart showing a direction decision process of step S64 which is a subroutine of the analogically similar word production subroutine process of FIG. 15.

FIG. 17 is a flowchart showing a direction decision process DirDec (il, ik, Mlk, Wordk, result) of step S64 or S65 which is a subroutine of the analogically similar word production subroutine of FIG. 16. In the case of the direction decision process DirDec in step S64 of FIG. 16, k=2, and in the case of the direction decision process DirDec in step S65 of FIG. 16, k=3. It is noted here that the term, "current element", refers to a currently processed element out of the elements of the pseudo-distance matrix, and the term, "next element", refers to an element to be processed that comes next to the current element in the pseudo-distance matrix.

The direction decision process DirDec (il, ik, Mlk, Wordk, result) in steps S64 and S65 of FIG. 17 is to compute the direction of one movement from one element to the next element of the pseudo-distance matrix. In this case, if the value of the next element differs from the current element by only the differnce in the corresponding letters, then a diagonal move is possible. When the letters of inputted letter strings are different from each other, the pseudo distance is increased by a value of 1. Therefore, in a move in the opposite direction, if corresponding letters of inputted letter strings are different from each other, the path follows a diagonal move when the one-preceding element differs by one. If corresponding letters of the inputted letter strings are equal to each other, an element that is one precedent to the current element in the diagonal direction has the same value as the current element. If the value of the element just above the current element is the same as the value of the current element, the horizontal move is possible. The vertical move is possible if the value of the element on a side (right or left) of the current element differs by one from the value of the current element.

Referring to FIG. 17, first of all, it is decided in step S110 whether or not the value Mlk[il][ik] of the ik-th element of the il-th row of the pseudo-distance matrix Mlk is equal to a sum value {Mlk[il−1][ik−1]+true(Word1[il]≠Wordk[ik])} obtained by adding up a value Mlk[il−1][ik−1] of the (ik−1)-th element of the (il−1)-th row of the pseudo-distance matrix Mlk, and a functional value of the function true (Word1[il]≠Wordk[ik]). If equality does not hold step S110, the program flow goes to step S11, where the diagonal direction is set for the result value, result, and the program flow returns to the analogically similar word production subroutine of FIG. 16. If the equality holds in step S110, the program flow goes to step S111, where the result value, result, is assigned the diagonal direction and the program flow returns to the analogically similar word production subroutine of FIG. 16. Also, if the equality does not hold in step S110, it is decided in step S112 whether or not the value Mlk[il][ik] of the ik-th element of the il-th row in the pseudo-distance matrix Mlk is equal to the value of the value Mlk[il][ik−1] of the one-preceding (ik−1)-th element of the same row in the pseudo-distance matrix Mlk. If equality holds in step S112, the program flow goes to step S113, where the result value, result, is assigned the horizontal direction and then the program flow returns to the analogically similar word production subroutine process of FIG. 16. If the equality does not hold in step S112, the program flow goes to step S114, where it is decided whether or not the value Mlk[il][ik] of the ik-th element of the i1-th row of the pseudo-distance matrix Mlk is equal to a value {Mlk[il−1]+1} obtained by adding a numerical value of 1 to the value Mlk[il−1][ik] of the same ik-th element of the one-preceding (il−1)-th row of the pseudo-distance matrix Mlk. If equality holds in step S114, the program flow goes to step S115, where the result value, result, is assigned the vertical direction and then the program flow returns to the analogically similar word production subroutine process of FIG. 16. Also, if equality does not hold in stop S114, it means that the value of the ik-th element of the il-th row of the pseudo-distance matrix Mlk does not accord with the computation of the pseudo-distance matrix, so that the program decides that an analogically similar word cannot be produced, thus ending with a production failure.

Figure 18:
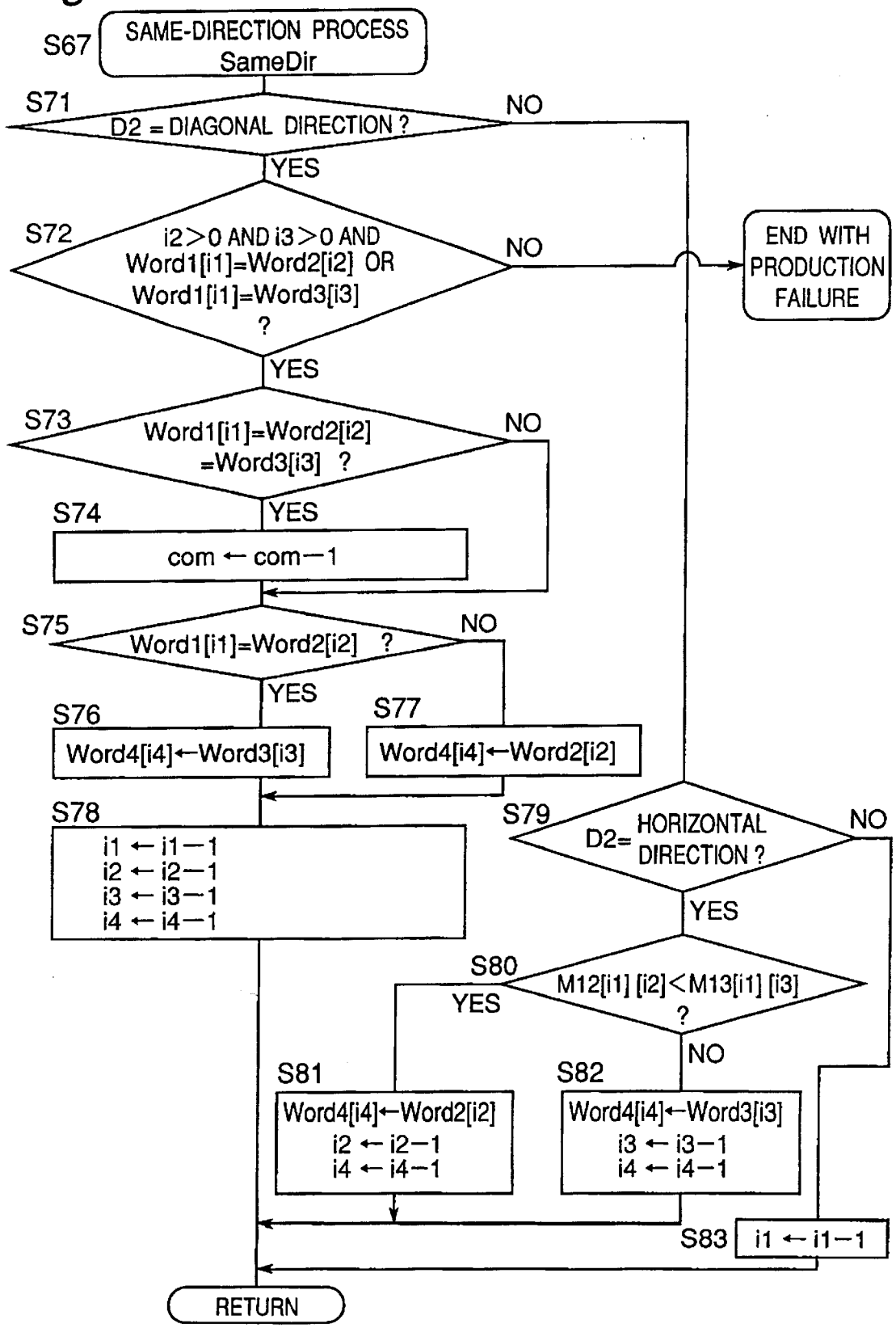
FIG. 18 is a flowchart showing a same direction process of step S67 which is a subroutine of the analogically similar word production subroutine process of FIG. 16.

FIG. 18 is a flowchart showing the same-direction process SameDir (step S67) which is a subroutine of the analogically similar word production subroutine process of FIG. 16. The same-direction process is a process for cases where the direction of move is equal between both pseudo-distance matrices M12 and M13. When both moves are in the diagonal direction, at least one of the letters of the first inputted letter string must be the same as a letter of another inputted letter string. Otherwise, the production of an analogically similar word is impossible according to the constraint condition that any letter of the first inputted letter string must appear in any position of the second or third inputted letter string, thus meaning a production failure. When any same letter is contained in the three inputted letter strings, the letter may be copied to the analogically similar word. If a letter of the first inputted letter string is the same as a letter of the second inputted letter string only, then the letter from the third inputted letter string is copied to the analogically similar word. If a letter of the first inputted letter string is the same as a letter of the third inputted letter string only, then the letter from the second inputted letter string is copied to the analogically similar word. Also, if both moves are of the horizontal direction, one move is performed in one pseudo-distance matrix, while no move is performed in the other pseudo-distance matrix. Since the move is performed with the smaller pseudo-distance matrix, the letter from the second or third inputted letter string is copied to the analogically similar word. If both moves are of the vertical direction, it means that none of the letters are copied to the analogically similar word. In each pseudo-distance matrix, only one move is possible.

Referring to FIG. 18, first of all, it is decided in step S71 whether or not the value of parameter D2 is diagonal. If the value of parameter D2 is not diagonal, the program flow goes to step S79. If the value of parameter D2 is diagonal in step S71, the program flow goes to step S72, where it is decided whether or not the values of parameters i2 and i3 are greater than 0, respectively, and whether or not the il-th letter Word1[i1] in the first inputted letter string Word1 is equal to the i2-th letter Word2[i2] in the second inputted letter string Word2 or the i1-th letter Word1[i1] in the first inputted letter string Word1 is equal to the i3-th letter Word3[i3] in the third inputted letter string Word3. If NO is answered in step S72, it means that there exists no analogically similar word which is analogically similar to the three inputted letter strings in that order and therefore that the analogically similar word production process is incapable of generating such a letter string, thus the program ending with a production failure.

On the other hand, if YES is answered at step S72, the program flow goes to step S73, where it is decided whether or not the i1-th letter Word1[i1] in the first inputted letter string Word1, the i2-th letter Word2[i2] in the second inputted letter string Word2, and the i3-th letter Word3[i3] in the third inputted letter string Word3 are equal to one another. If they are equal, the program flow goes to step S74, where the parameter com is set by being incremented by one and the program flow goes to step S75. Also, if NO is answered in step S73, the program flow goes to step S75, directly.

In step S75, it is decided whether or not the i1-th letter Word1[i1] in the first inputted letter string Word1, the i2-th letter Word2[i2] in the second inputted letter string Word2 are equal to each other. If they are equal, the program flow goes to step S76, where i3-th letter Word3[i3] in the third inputted letter string Word3 is set to the i4-th element Word4[i4] in the produced letter string Word4 and then the program flow goes to step S78. Also, if they are not equal in step S75, the i2-th letter Word2[i2] in the second inputted letter string Word2 is set to the i4-th element Word4[i4] in the produced letter string Word4 and then the program flow goes to step S78. In step S78, the values of all the parameters i1, i2 and i3 are set by being decremented by one, and the program flow returns to the analogically similar word production subroutine of FIG. 16.

In step S79, which follows an answer of NO in step S71, it is decided whether or not the value of parameter D2 is diagonal. In this case, if the value of parameter D2 is not equal to the horizontal direction, the parameter i1 is decremented by one in step S83 and the program flow returns to the analogically similar word production subroutine process of FIG. 16. Also, if the value of parameter D2 is horizontal in step S79, the program flow goes to step S80, where it is decided whether or not the value M12[i1][i2] of the i2-th element of the i1-th row of the pseudo-distance matrix M12 is smaller than the value M13[i1][i3] of the i3-th element of the i1-th row of the pseudo-distance matrix M13. If YES is answered in step S80, the i2-th letter Word2[i2] in the second letter string Word2 is set to the i4-th element Word4[i4] in the produced letter string Word4 and further the values of parameters i2 and i4 are set by being decremented by one, respectively, in step S81, and the program flow returns to the analogically similar word production subroutine process of FIG. 16.

Also, if NO is answered in step S80, the program flow goes to step S82, where the i3-th letter Word3[i3] in the third inputted letter string Word3 is set to the i4-th element Word4[i4] in the producd letter string Word4 and further the values of the parameters i3 and i4 are set by being decremented by one and thereafter the program flow returns to the analogically similar word production subroutine of FIG. 16.

Figure 19:
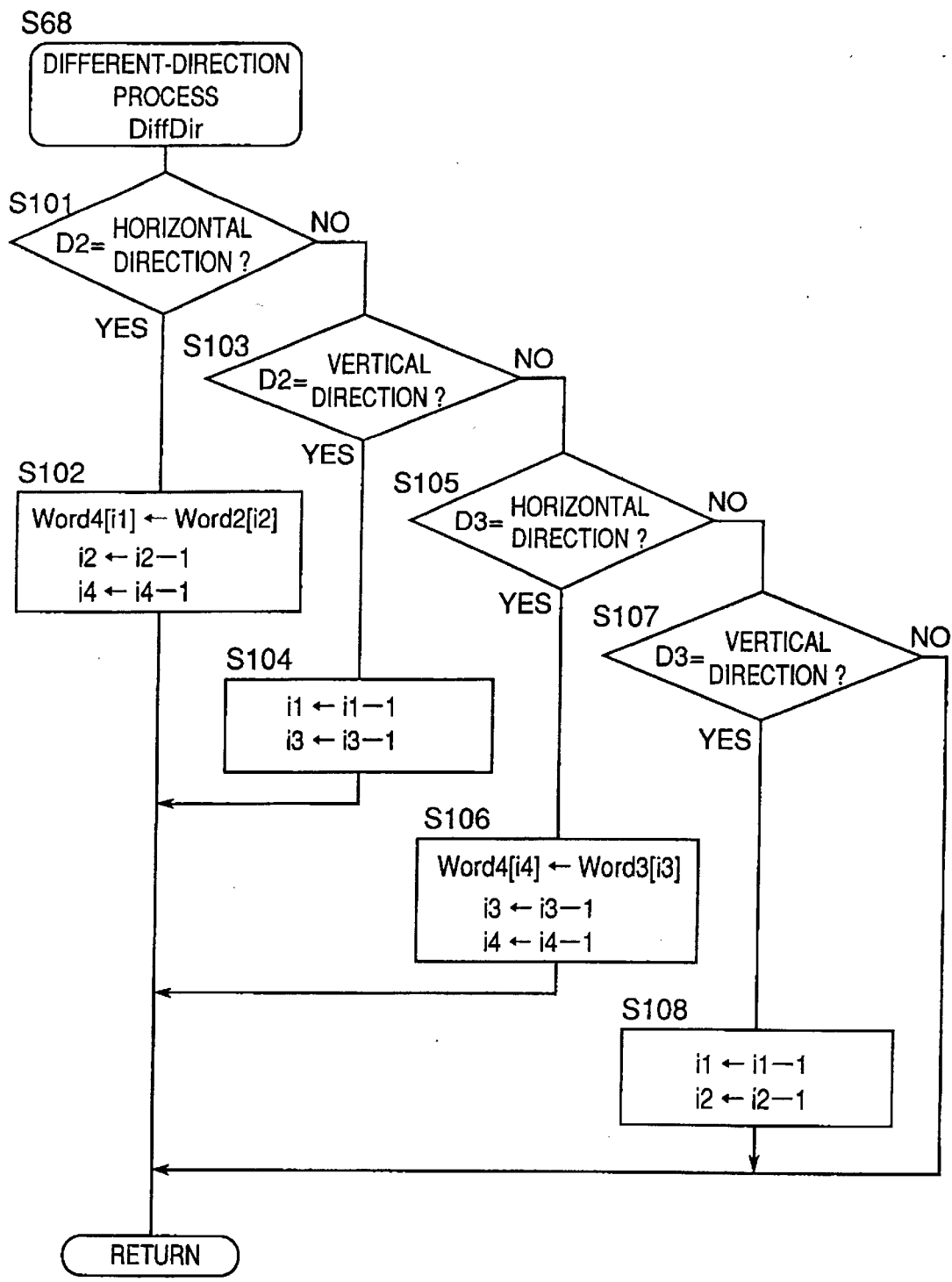
FIG. 19 is a flowchart showing a different direction process of step S68 which is a subroutine of the analogically similar word production subroutine process of FIG. 16.

FIG. 19 is a flowchart showing the different-direction process DiffDir of step S68, which is a subroutine of the analogically similar word production subroutine process of FIG. 16. The different-direction process DiffDir in step S68 is a process for cases where move directions are different between the two pseudo-distance matrices. Letters are copied only when one of the move directions of the two pseudo-distance matrices is horizontal. When the move in the pseudo-distance matrix between the first inputted letter string and the second inputted letter string is horizontal, this letter derives from the third inputted letter string. In this case, no move is performed in the pseudo-distance matrix between the first inputted letter string and the second inputted letter string.

Referring to FIG. 19, first of all, it is decided in step S101 whether or not the parameter D2 is horizontal. If the value of parameter D2 is horizontal, the program flow goes to step S102, where the i2-th letter Word2[i2] in the second inputted letter string Word2 is set to the i4-th letter Word4[i4] in the produced letter string Word4 while the values of the parameters i2 and i4 are set by being decremented by one, respectively, and the program flow returns to the analogically similar word production subroutine process of FIG. 16.

Also, if NO is answered in step S101, the program flow goes to step S103, where it is decided whether or not the value of parameter D2 is vertical. If the value of parameter D2 is vertical, the values of parameters i1 and i3 are set by being decremented by one, respectively, in step S104 and the program flow returns to the analogically similar word production subroutine process of FIG. 16.

If the value of parameter D2 is not vertical in step S103, the program flow goes to step S105, where it is decided whether or not the value of parameter D3 is horizontal. If the value of parameter D3 is horizontal, the program flow goes to step S106, where the i3-th letter Word3[i3] in the third inputted letter string Word3 is set to the i4-th element Word4[i4] in the produced letter string Word4 while the values of the parameters i3 and i4 are set by being decremented by one, respectively, and the program flow returns to the analogically similar word production subroutine process of FIG. 16.

If the value of parameter D3 is not horizontal in step S105, the program flow goes to step S107, where it is decided whether or not the value of parameter D3 is vertical. If the value of parameter D3 is vertical, the program flow goes to step S108, where the values of parameters i1 and i2 are set by being decremented by one, respectively, and the program flow returns to the analogically similar word production subroutine process of FIG. 16. Also, if the value of parameter D3 is not vertical in step S107, the program flow returns to the analogically similar word production subroutine process of FIG. 16 directly.

The analogically similar word production apparatus 100 according to the preferred embodiment allows to the analogically similar word production process to be stopped prematurely under the following predetermined conditions, thereby making it possible to reduce the processing time. The conditions are, for example, as follows:

<Condition>: The current position in the first inputted letter string is not equal to a sum value obtained by adding up a value of the element of the rank of the current position in the second inputted letter string in the row of the rank of the current position in the first inputted letter string in the pseudo-distance matrix between the first and second inputted letter strings, a value of the element of the rank of the current position in the third inputted letter string in the row of the rank of the current position in the first inputted letter string in the pseudo-distance matrix between the first and third inputted letter strings, and the number of common letters to the three inputted letter strings.

The above condition will be described below. This condition is a case where the current position i1 in the first inputted letter string Word1 is not equal to a sum value obtained by adding up a value M12[i1][i2] of the element of the rank of the current position i2 in the second inputted letter string Word2 in the row of the rank of the current position i1 in the first inputted letter string Word1 in the pseudo-distance matrix M12 between the first and second inputted letter strings Word1 and Word2, a value M13[i1][i3] of the element of the rank of the current position i3 in the third inputted letter string Word3 in the row of the rank of the current position i1 in the first inputted letter string Word1 in the pseudo-distance matrix M13 between the first and third inputted letter strings Word1 and Word3, and the number of common letters com common to the three inputted letter strings, i.e., a case where the sum of similitudes or similarities of the second inputted letter string up to the rank i2 and the first letter string up to the rank i1 is not equal to a sum of the rank of the current position i1 in the first inputted letter string and the number of common letters com common to the three inputted letter strings.

Accordingly, this condition is a case where a sum of the similitude between the second inputted letter string up to the rank i2 and the first inputted letter string up to the rank i1, and the similitude between the third inputted letter string up to the rank i3 and the first inputted letter string up to the rank i1 is smaller than a sum of the rank of the current position i1 in the first inputted letter string and the number of common letters com common to the three inputted letter strings, or a case where a sum of a similitude between the second inputted letter string up to the rank i2 and the first inputted letter string up to the rank i1 and a similitude between the third inputted letter string up to the rank i3 and the first inputted letter string up to the rank i1 is greater than the sum of the rank of the current position i1 in the first inputted letter string and the number of letters com common to the three inputted letter strings.

When the sum of a similitude between the second inputted letter string up to the rank i2 and the first inputted letter string up to the rank i1 and a similitude between the third inputted letter string up to the rank i3 and the first inputted letter string up to the rank i1 is smaller than the sum of the rank of the current position i1 in the first inputted letter string and the number of common letters com common to the three inputted letter strings, some letters of the first inputted letter string up to the rank i1 belong neither to the second inputted letter string up to the rank i2 nor to the third inputted letter string up to the rank i3. This means that there exists no letter string analogically similar to the three inputted letter strings up to the respective ranks l1, i2 and i3. Accordingly, in order to produce an analogically similar word, any letter in the first inputted letter string has to belong either to the second inputted letter string or to the third inputted letter string (See also the foregoing constraint condition to be applied). In this case, the process of production of a letter string analogically similar to the three inputted letter strings results in a failure (See step S63 in FIG. 16).

When the sum of a similitude between the second inputted letter string up to the rank i2 and the first inputted letter string up to the rank i1 and a similitude between the third inputted letter string up to the rank i3 and the first inputted letter string up to the rank i1 is larger than the sum of the rank of the current position i1 in the first inputted letter string and the number of common letters com common to the three inputted letter strings, letter strings up to the ranks i1, i2 and i3 which have currently been produced and which are analogically similar to the three inputted letter strings are contradictory to the number of letters common to the three inputted letter strings. In this case, the process of production of a letter string analogically similar to the three inputted letter strings results in a failure (See step S63 in FIG. 16).

In the above-described present preferred embodiments, the number of operations of deletion and replacement is used without modification as the definition of the pseudo distance of edition to be used for the computation of the similarity. However, the present invention is not limited to present preferred embodiment, and it is acceptable to set weights for every type of operation as a modification. Also in the analogically similar word production apparatus of the present preferred embodiment, it is acceptable to introduce weight calculation into the portion of similitude calculation, which allows weighted analogically similar word production process to be achieved.

Next, as another preferred embodiment of the present invention, a speech automatic translation system using the analogically similar wordproduction apparatus 100 is described below with reference to FIG. 20. Referring to FIG. 20, uttered speech is inputted to a microphone 11 and converted into an audio signal, and then subjected to A/D conversion from an analog audio signal into a digital audio signal in an A/D converter 12. The digital audio signal is inputted into a speech recognition apparatus 13, where the signal is subjected to, for example, an LPC analysis so that feature parameters such as cepstrum coefficient are extracted. The speech recognition apparatus 13 performs phoneme recognition by looking up to a specified hidden Markov model within an HMM memory 31 based on the extracted feature parameters, and thereafter word recognition is performed by looking up to statistic language models within a language model memory 32, by which a speech recognition process is executed and text data of speech-recognized letter string is outputted to a pattern adding section 14.

A similar-word pattern memory 33 is connected to the pattern adding section 14. In this similar-word pattern memory 33, similar-word patterns each of which is composed of a word pair paired with each other, for example, by inserting or deleting a prefix or suffix are previously stored in correspondence to a plurality of words, as will be described in a later-described preferred embodiment. The pattern adding section 14 searches the similar-word pattern memory 33 for a word pair of a similar-word pattern corresponding to each of the words contained in text data of inputted letter strings, and adds the word pair of the similar-word pattern to a processing-target word, thus outputting totally three words of the processing-target word and the two paired words to the analogically similar word production apparatus 100.

The analogically similar word production apparatus 100 executes the analogically similar word production process based on the third inputted words, thereby producing an analogically similar word, and outputs to an automatic translation apparatus 15 text data of word strings of an analogically similar word corresponding to each word string outputted from the speech recognition apparatus 13. A translation pattern memory 34 for storing text data of translation patterns from Japanese into English as an example is connected to the automatic translation apparatus 15. The automatic translation apparatus 15 executes the translation from Japanese into English by looking up to the translation patterns within the translation pattern memory 34 based on text data (in Japanese) of inputted word strings, outputting text data (in English) of the translation-result word strings and printing out the data on recording paper while outputting and displaying the data onto a CRT display 23.

The speech automatic translation system of present preferred embodiment, which is equipped with the above-described analogically similar word production apparatus 100, is enabled to automatically translate sentences of word strings of analogically similar words analogized from speech signals of letter strings or word strings inputted via the microphone 11, and to output the translation results to the printer 22 or display the results onto the CRT display 23.

EXPERIMENTAL EXAMPLES

The following examples show actual production results of analogically similar words by the analogically similar word production apparatus method which is a preferred embodiment according to the present invention. In the following relational expression A:B=C:x, A represents a first inputted letter string, B represents a second inputted letter string, C represents a third inputted letter string, and x represents an analogically similar word analogically produced from the relation among the first letter string A, the second letter string B and the third letter string C by the analogically similar word production apparatus 100 of the preferred embodiment according to the present invention.

<A1> Insertion or deletion of prefixes or suffixes:
<<A1.1>> With Latin word input:

oratorem:orator=honorem:x x=honor     (14)

<<A1.2>> With French word input:

répression:répressionnaire=réaction:x x=réactionnaire     (15)

<<A1.3>> With Malay word input:

tinggal:ketinggalan=duduk:x x=kedudukan     (16)

<<A1.4>> With Chinese Kanji word input:

科学(science):科学家(scientist)政治(politics):x x=政治家(politician in English)     (17)

<A0.2> Exchange of prefixes or suffixes:
<<A2.1>> With English word input:

wolf:wolves=leaf:x x=leaves     (18)

<<A2.2>> With Malay word input:

kawan:mengawani=keliling:x x=mengelilingi     (19)

<<A2.3>> With Malay word input:

keras:mengeraskan=kena:x x=mengenakan     (20)

<<A2.4>> With Polish word input:

wyszedleś:wyszłaś=poszedlłeś:x x=poszłaś     (21)

<A3> Insertion of infixes and umlauts:
<<A3.1>> With Japanese word input:

乗る(ride):乗せる(make somebody ride)=寄る(pull in):x x=寄せる(make somebody pull in)     (22)

<<A3.2>> With German word input:

lang:längste=scharf:x x=schärfste     (23)

<<A3.3>> With German word input:

fliehen:er floh=schließen:x x=er schloß     (24)

<<A3.4>> With Polish word input:

zgubiony:zgubieni=zmartwiony:x x=zmartwieni     (25)

<<A3.5>> With Akkadian word input:

ukaššad:uktanaššad=ušakšad:x x=uštanakšad     (26)

<A4> insertion of a plurality of infixes to produce an analogically similar word:
<<A4.1>> With Proto-semitic word input:

yasriqu:sariq=yanqimu:x x=naqim     (27)

<<A4.2>> With Arabic word input:

huzila:huzāl=sudi'a:x x=sudā'     (28)

<<A4.3>> With Arabic word input:

arsala:mursilun=aslama:x x=muslimun

From these several examples, it can be seen that analogically similar words can be produced in a multiplicity of actual languages by the analogically similar word production method of present preferred embodiment.

As described above, according to preferred embodiments of the present invention, the following advantageous effects can be provided:

(1) Given three word strings, the fourth unit string that is analogized from the three unit strings can be produced. Also, since the verification of the constraint condition related to the analogy restricts the calculation of each element in the pseudo-distance matrix, it is possible to make an early end when the production results in a failure. As a result, the computation cost is decreased so that computation process can be achieved faster than the prior art:

(2) Also, since attributes do not need to be added as in the prior art, there is no need for experts for attribute addition. Therefore, storage equipment for storing the attributes does no need to be provided, so that the apparatus construction can be downsized;

(3) Further, similar words analogically similar to each other, which has been impossible in the second prior art, can be exchanged; and (4) Still further, it is demonstrated that the present invention is capable of treating many different cases in many different languages, and can be developed into iterative processes as described in the preferred embodiments.

The followings are additional description of the above-mentioned preferred embodiments.

Additional Description 1

Explanation of the computation of the elements in the matrices of FIGS. 6 and 7 will be described. In the following, Word[1, . . . ,i] means the letter string composed of the first letter in Word up to the i-th letter in Word.

Referring to FIGS. 1 and 2, we will explain the computation of the edit distance. In a matrix of distance computation M for the letter strings Word1 and Word2, the value of each element M[i1][i2] is the value of the distance of the edit distance between the two letter strings Word1[1, . . . ,i1] and Word2[1, . . . ,i2]. The value of each element in the matrix M is computed by considering the values of the three immediate previous elements of the previous line and the previous column, according to the following general equation, given in the description of Prior Art Document 5.

$$
\begin{aligned}
M[i1][i2] = \min ( & \qquad <1> \\
M[i1-1][i2-1] + \mathrm{true}(Word1[i1] \neq Word2[i2]), & \qquad <2> \\
M[i1-1][i2] + 1, & \qquad <3> \\
M[i1][i2-1] + 1) & \qquad <4>
\end{aligned}
\tag{30}
$$

For convenience of description, the line numbers <1> to <4> are added in Equation (30). Line <2> of Equation (30) means that, the distance between Word1[1, . . . ,i1], and Word2[1, . . . ,i2] may differ from the distance between both letter strings up to the previous letters, i.e., from the distance between the two letter strings Word1[1, . . . ,i1−1] and Word2[1, . . . ,i2−1], by just the difference between the two added letters Word1[i1] and Word2[i2]. Hence, if the two added letters Word1[i1] and Word2[i2] are equal to each other, the distance between Word1[1, . . . ,i1] and Word2[1, . . . ,i2] may be equal to the distance between both letter strings up to the previous letters, i.e., equal to the distance between the two letter strings Word1[1, . . . ,i1−1] and Word2[1, . . . ,i2−1]. If the two added letters Word1[i1] and Word2[i2] are different from each other, the distance between Word1[1, . . . ,i1] and Word2[1, . . . ,i2] may be equal to the distance between both letter strings up to the previous letters, i.e., equal to the distance between the two letter strings Word1[1, . . . ,i1−1] and Word2[1, . . . ,i2−1], plus the difference of one letter.

Line <3> of Equation (30) means that the distance between two letter strings Word1[1, . . . ,i1−1] and Word2[1, . . . ,i2] may differ from the distance between the two letter strings Word1[1 . . . i1−1] and Word2[1, . . . ,i2−1] by just the difference of adding letter Word2[i2] to the end of Word2[1 . . . i2−1], which makes a difference of 1 letter.

Similarly, line <4> of Equation (30) means that the distance between two letter strings Word1[1, . . . ,i1] and Word2[1 . . . i2−1] may differ from the distance between the two letter strings Word1[1, . . . ,i1−1] and Word2[1, . . . ,i2−1] by just the difference of adding letter Word1[i1] to the end of Word1[1, . . . ,i1−1], which makes a difference of 1 letter.

Because of the intuitive notion of a distance as a smallest value, and from the possible three ways of computing the value of the distance between Word1[1, . . . ,i1] and Word2[1, . . . ,i2], Line <1> of Equation (30) means that the value of the distance between Word1[1, . . . ,i1] and Word2[1, . . . ,i2], i.e. the value of the element M[i1][i2], is the minimum over the three possible computations given on lines <2>, <3> and <4> of Equation (30).

Referring to FIGS. 4 and 5, we will now explain the computation of pseudo-distances. The computation of the pseudo-distance between two letter strings Word1 and Word2 is made similar to the computation of the edit distance and it uses a similar equation:

$$
\begin{aligned}
M[i1][i2] = \min ( & \qquad <1> \\
M[i1-1][i2-1] + \mathrm{true}(Word1[i1] \neq Word2[i2]), & \qquad <2> \\
M[i1-1][i2] + 1, & \qquad <3> \\
M[i1][i2-1]) & \qquad <4>
\end{aligned}
\tag{31}
$$

For convenience of description, the line numbers <1> to <4> are added in Equation (31). The difference between Equations (30) and (31) is only a difference on line <4>. This difference means that, the pseudo-distance between the letter strings Word1[1 . . . i1] and Word2[1 . . . i2] may be equal to the pseudo-distance between the letter string Word1[1 . . . i1] and Word2[1 . . . i2−1]. In other words, the addition of a letter to the end of the-letter string Word2[1 . . . i2] may not affect the value of the pseudo-distance. In still other words, the difference between the edit distance of the previous technique of Prior Art Document 5, and the pseudo-distance of the present invention, is that in a pseudo-distance, insertions of letters in the second letter string do not count.

Additional Description 2

Explanation of the difference between FIGS. 6 and 7 will be described below. In both of FIGS. 6 and 7, the values of the elements are computed using Equation (31). However, the difference between FIGS. 6 and 7 is that, in FIG. 7, only those elements in a diagonal band are taken into account in the computation.

Hence, FIG. 6 shows the computation of the pseudo-distance between two letter strings, whereas FIG. 7 shows the computation of a limited pseudo-distance between two letter strings. The elements in the diagonal band are locally positioned on each line of the matrix between two parameters ikleft and ikright computed for each line of the matrix. ikleft is the index of the column of lowest index in the band on the current line. ikright is the index of the column of highest index in the band on the current line.

The values of the elements outside of a band, i.e., the values of those elements whose column index is outside of ikleft and ikright, may be initialized to a value equal to the greatest possible value, so that, when computing the value of the element using the general equation, i.e., taking a minimum, the values of the elements outside of the band will have no influence on the result of the computation. The initialization of the elements outside of the band to the greatest possible value may be performed in advance. This is performed in step S95 of FIG. 11.

Following the fact that, according to Equation (31), each element value is computed as a minimum, when only the values of the elements in a band are taken into account in the computation, less information is used, and as a consequence, the value of the last element (bottom rightmost element for the computation of the pseudo-distance between "like" and "known" in FIG. 6, bottom leftmost element for the computation of the pseudo-distance between "like" and "unlike" in FIG. 6) may be greater than the value of the last element (bottom rightmost element for the computation of the pseudo-distance between "like" and "known" in FIG. 7, bottom leftmost element for the computation of the pseudo-distance between "like" and "unlike" in FIG. 7) of the matrix where all elements were taken into account during computation. This is the case in FIG. 7, where the value 4 of the bottom rightmost element, which has been obtained by taking into account only the values of the elements in a band, is greater than the value 3 of the bottom rightmost element in FIG. 6. which has been obtained by taking into account all the values of all the elements of the matrix.

Additional Description 3

Explanation of the. computation of the shortest path will be described below. Referring to FIG. 8, we explain the computation of the shortest path. In a pseudo-distance matrix M between two letter strings Word1 of length 11 and Word2 of length 12, the last element is the element M[11][12]. Referring to FIG. 8, the last element in the matrix of the limited pseudo-distance between the letter strings "like" and "unlike" is the bottom leftmost element in this matrix. Also, referring to FIG. 8, the last element in the matrix of the limited pseudo-distance between the letter strings "like" and "known" is the bottom rightmost element in this matrix.

In a pseudo-distance matrix M between two letter strings Word1 and Word2, the first element is the element M[1][1]. Referring to FIG. 8, the first element in the matrix of the limited pseudo-distance between the letter strings "like" and "unlike" is the top rightmost element in this matrix. Also, referring to FIG. 8, the first element in the matrix of the limited pseudo-distance between the letter strings "like" and "known" is the top leftmost element in this matrix.

The computation of the shortest path in a matrix of pseudo-distance or limited pseudo-distance is performed from the last element to the first element in the matrix.

For a current element on the shortest path, the preceding element on the shortest path may be one of the three preceding elements, i.e., either the preceding element in diagonal, or the preceding element on the same line, or the preceding element on the same column.

Which element is chosen is decided by comparing the value of the current element to the value of the preceding elements as described in Steps S110, S112 and S114. Each of these comparisons in steps S110, S112 and S114 determines which of the lines <2>, <3> and <4> had been used in Equation (31) to compute the value of the current element.

Because steps S110, S112 and S114 test the preceding elements in the order diagonal element, horizontal element, and then, vertical element, it means that a diagonal progression is always preferred over a horizontal progression, and that a horizontal progression is always preferred over a vertical progression.

Additional Description 4

General meaning of the shortest path will be described below. The shortest path in the limited pseudo-distance matrix represents the shortest way to go from the end of both letter strings to the beginning of both letter strings following the smallest values in the matrix.

As an intuitive comparison, if one imagines that the matrix represents a relief map, and that the value in each element represents a height, the shortest path is the path according to which a river would flow from the highest point in the relief map (the last element in the matrix at the end of both letter strings) to the lowest point in the relief map (the beginning of both letter strings).

Additional Description 5

The steps for computing the shortest paths in the processing flows will be described below. The direction of the shortest paths in both matrices M12 and M13 from the current elements to the preceding elements are computed step by step by calling and executing the direction decision process (DirDec) of FIG. 7 in steps S64 and S65. The line number and the column number of the preceding elements in both matrices M12 and M13 are computed in the same direction process (SameDir) of FIG. 18 and the different direction process (DiffDir) of FIG. 19 called in steps S67 or S68.

The direction from the current element to the preceding element is computed in the steps S110 to S115 (S110, S111, S112, S113, S114 and S115). The actual computation of the indices or element numbers of the preceding element on the shortest path is performed in S78, S81, S82 and S83, or S102, S104, S106 and S108.

Additional Description 6

Update of the status parameter com will be described. At the beginning of the process, the parameter com represents a number of units common to the first, second an third inputted unit strings and the fourth produced analogically similar unit string. More specifically, at the beginning of the process, the parameter com represents a number of units common to the first inputted unit strings Word1[1, . . . ,l1], the second inputted unit strings Word2[1, . . . ,l2], the third inputted unit strings Word3[1, . . . ,l3], and the fourth produced analogically similar unit string.

Because the fourth analogically similar unit string is produced while going along the shortest paths in the pseudo-distance matrices, when the process is at index i1 in the first inputted unit string Word1 and index i2 in the second inputted unit string Word2 and index i3 in the third inputted unit string Word3, it means that the process has still to be executed for the remaining part Word1[1, . . . ,i1] of the first inputted unit string Word1, the remaining part Word2[1, . . . ,i2] of the second inputted unit string Word2 and the remaining part Word3[1, . . . ,i3] of the third inputted unit string Word3.

During the process, the parameter com represents the number of units common to the remaining part Word1[1, . . . ,i1] of the first inputted unit string Word1, the remaining part Word2[1, . . . ,i2] of the second inputted unit string Word2 and the remaining part Word3[1, . . . ,i3] of the third inputted unit string Word3. For the parameter com to represent the number of units common to the remaining part Word1[1, . . . ,i1] of the first inputted unit string Word1, the remaining part Word2[1, . . . ,i2] of the second inputted unit string Word2 and the remaining part Word3[1, . . . ,i3] of the third inputted unit string Word3 during the whole process, as soon as a unit common to the first inputted unit string Word1 and the second inputted unit string Word2 and the third inputted unit string Word3 is detected, the parameter com should be decreased by the number 1 of units found common to the first inputted unit string Word1 until index i1 and the second inputted unit string Word2 until index i2 and the third inputted unit string Word3 until index i3. Consequently, step S73 detects whether or not the current three units of the three inputted unit strings are the same. If it is the case that they are the same, the process continues to Step S74. If this is not the case, the process skips step S74 and goes directly to step S75.

The parameter com is updated in Step S74. In this case, it is found in step S73 that the i1-th unit of the first inputted unit string Word1 is equal to the i2-th unit of the second inputted unit string Word3 and the i3-th unit of the third inputted unit string Word3 at the same time, and hence, the parameter com is decreased by one in step S74.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An analogically similar word production apparatus (100) for, based on first, second and third three inputted unit strings which are inputted in a predetermined order, producing an analogically similar word having properties analogically similar in a predetermined analogically similar relation to the first to third unit strings, comprising:

matrix storage means (10) for storing a plurality of elements of a first limited pseudo-distance matrix, and a plurality of elements of a second limited pseudo-distance matrix, a number of units to be deleted or replaced toward another unit string from one unit string being expressed by a pseudo-distance, said plurality of elements of said first limited pseudo-distance matrix being computed at locations of a part of elements of a first pseudo-distance matrix presenting pseudo-distances between partial strings of the first inputted unit string from its beginning to its end and partial strings of the second inputted unit string from its beginning to its end, said plurality of elements of said first limited pseudo-distance matrix including a diagonal band composed of diagonal elements having a predetermined width in said first pseudo-distance matrix, and including an extra band composed of elements having a predetermined further width in said first pseudo-distance matrix which are positioned outside of said diagonal band, so as to include information sufficient for computation of limited pseudo distances between the first inputted unit string and the second inputted unit string, said plurality of elements of said second limited pseudo-distance matrix being computed at locations of a part of elements of a second pseudo-distance matrix presenting pseudo-distances between partial strings of the first inputted unit string from its beginning to its end and partial strings of the third inputted unit string from its beginning to its end, said plurality of elements of said second limited pseudo-distance matrix including a diagonal band composed of diagonal elements having a predetermined width in said second pseudo-distance matrix, and including an extra band composed of elements having a predetermined further width in said second pseudo-distance matrix which are positioned outside of said diagonal band, so as to include information sufficient for computation of limited pseudo distances between the first inputted unit string and the third inputted unit string;

preprocessing means (2, S2) for analyzing the three inputted unit strings, computing the elements of the limited first and second pseudo-distance matrices, and storing computed elements into said matrix storage means (10);

parameter storage means (51) for storing therein a status parameter (com) which is a parameter for judging whether or not four unit strings including the first, second and third inputted unit strings, and produced fourth inputted unit string are in said analogically similar relation, and which represents a number of units common to the four unit strings upon producing the fourth unit string; and analogically similar word production means (5, S3) for, based on respective lengths of said inputted three unit strings and respective elements of said limited first and second pseudo-distance matrices which are stored in said matrix storage means (10), computing an initial value of said status parameter (com) and storing the initial value in said parameter storage means (51), thereafter, based on the status parameter (com) stored in said parameter storage means (51) and respective elements of said limited first and second pseudo-distance matrices stored in said matrix storage means (10), deciding (S63–S68) a shortest path from a last element to a first element in said first limited pseudo-distance and a shortest path from a last element to a first element in said second limited pseudo-distance while updating (S74) the status parameter (com) stored in said parameter storage means (51), by moving said paths from an element to another element in a moving direction which is either one of a diagonal direction, a horizontal direction and a vertical direction in said limited first and second pseudo-distance matrices, and then, producing and outputting the analogically similar word according to decided shortest paths of said limited first and second pseudo-distance matrices.

2. The apparatus as claimed in claim 1, wherein the unit string is a letter string, wherein the unit which constitutes the unit string is a letter.

3. The apparatus as claimed in claim 1, wherein the unit string is a word string, wherein the unit which constitutes the unit string is a word.

4. An analogically similar word production method (100) for, based on first, second and third three inputted unit strings which are inputted in a predetermined order, producing an analogically similar word having properties analogically similar in a predetermined analogically similar relation to the first to third unit strings, including steps of:

analyzing (2, S2) the inputted three unit strings, computing a plurality of elements of a first limited pseudo-distance matrix, and a plurality of elements of a second limited pseudo-distance matrix, and storing computed elements into in matrix storage means (10), a number of units to be deleted or replaced toward another unit string from one unit string being expressed by a pseudo-distance, said plurality of elements of said first limited pseudo-distance matrix being computed at locations of a part of elements of a first pseudo-distance matrix presenting pseudo-distances between partial strings of the first inputted unit string from its beginning to its end and partial strings of the second inputted unit string from its beginning to its end, said plurality of elements of said first limited pseudo-distance matrix including a diagonal band composed of diagonal elements having a predetermined width in said first pseudo-distance matrix, and including an extra band composed of elements having a predetermined further width in said first pseudo-distance matrix which are positioned outside of said diagonal band, so as to include information sufficient for computation of limited pseudo distances between the first inputted unit string and the second inputted unit string, said plurality of elements of said second limited pseudo-distance matrix being computed at locations of a part of elements of a second pseudo-distance matrix presenting pseudo-distances between partial strings of the first inputted unit string from its beginning to its end and partial strings of the third inputted unit string from its beginning to its end, said plurality of elements of said second limited pseudo-distance matrix including a diagonal band composed of diagonal elements having a predetermined width in said second pseudo-distance matrix, and including an extra band composed of elements having a predetermined further width in said second pseudo-distance matrix which are positioned outside of said diagonal band, so as to include information sufficient for computation of limited pseudo distances between the first inputted unit string and the third inputted unit string;

based on respective lengths of said inputted three unit strings and respective elements of said limited first and second pseudo-distance matrices which are stored in said matrix storage means (10), computing an initial value of a status parameter (com) which is a parameter for judging whether or not four unit strings including the first, second and third inputted unit strings, and produced fourth inputted unit string are in said analogically similar relation, and which represents a number of units common to the four unit strings upon producing the fourth unit string, and then, storing the initial value in a parameter storage means (51);

based on the status parameter (com) stored in said parameter storage means (51) and respective elements of said limited first and second pseudo-distance matrices stored in said matrix storage means (10), deciding (S63–S68) a shortest path from a last element to a first element in said first limited pseudo-distance and a shortest path from a last element to a first element in said second limited pseudo-distance while updating (S74) the status parameter (com) stored in said parameter storage means (51), by moving said paths from an element to another element in a moving direction which is either one of a diagonal direction, a horizontal direction and a vertical direction in said limited first and second pseudo-distance matrix; and producing and outputting (5, S3) the analogically similar word according to decided shortest paths of said limited first and second pseudo-distance matrices.

5. The method as claimed in claim 4, wherein the unit string is a letter string, wherein the unit which constitutes the unit string is a letter.

6. The method as claimed in claim 4, wherein the unit string is a word string, wherein the unit which constitutes the unit string is a word.

* * * * *

UNITED STATES PATENT AND TRADEMARK OFFICE
CERTIFICATE OF CORRECTION

PATENT NO. : 6,219,633 B1  
DATED : April 17, 2001  
INVENTOR(S) : Yves Lepage

Page 1 of 1

It is certified that error appears in the above-identified patent and that said Letters Patent is hereby corrected as shown below:

Sheets 18 and 19,
Sheets 18 and 19 are duplicate sheets both showing Figs. 23 and 24. Please replace the figures on Sheet 18 of the patent with the correct Figs. 21 and 22 as indicated below:

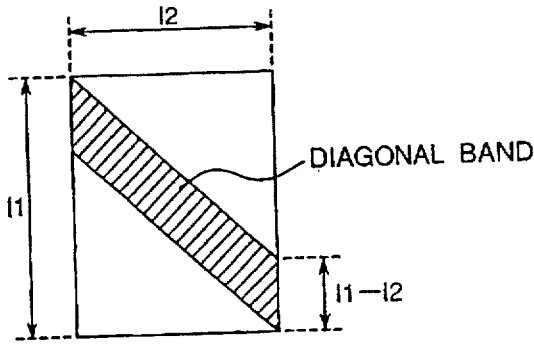

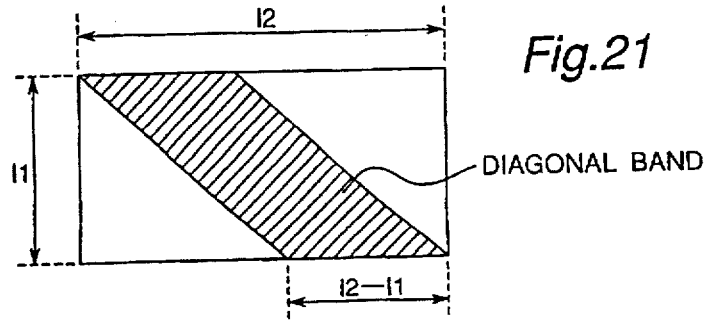

Signed and Sealed this

Fifth Day of February, 2002

Attest:

*Attesting Officer*

JAMES E. ROGAN
*Director of the United States Patent and Trademark Office*